(12) United States Patent
Okutsu et al.

(10) Patent No.: US 6,512,413 B2
(45) Date of Patent: Jan. 28, 2003

(54) VOLTAGE BOOSTER CIRCUIT APPARATUS

(75) Inventors: Mitsuhiko Okutsu, Mito (JP); Shoji Sato, Hitachi (JP)

(73) Assignees: Hitachi, Ltd., Tokyo (JP); Hitachi Engineering Co., Ltd., Hitachi (JP)

( * ) Notice: Subject to any disclaimer, the term of this patent is extended or adjusted under 35 U.S.C. 154(b) by 0 days.

(21) Appl. No.: 10/154,852

(22) Filed: May 28, 2002

(65) Prior Publication Data

US 2002/0140499 A1 Oct. 3, 2002

Related U.S. Application Data

(63) Continuation of application No. 09/421,236, filed on Oct. 20, 1999, now Pat. No. 6,433,623.

(30) Foreign Application Priority Data

Oct. 20, 1998 (JP) .............................. 10-297967

(51) Int. Cl.[7] ................................. G05F 3/24
(52) U.S. Cl. ..................... 327/543; 327/537; 363/60
(58) Field of Search ................. 327/536, 537, 327/538, 540, 541, 543, 270, 276; 363/59, 60; 307/110

(56) References Cited

U.S. PATENT DOCUMENTS

| | | | |
|---|---|---|---|
| 4,996,686 A | | 2/1991 | Imai |
| 5,105,144 A | | 4/1992 | Trump |
| 5,446,697 A | * | 8/1995 | Yoo et al. .................. 365/226 |
| 5,537,073 A | | 7/1996 | Arimoto |
| 5,701,096 A | | 12/1997 | Higahiho |
| 5,712,777 A | | 1/1998 | Nicolini et al. |
| 5,768,115 A | * | 6/1998 | Pascucci et al. .............. 363/59 |
| 5,901,055 A | | 5/1999 | Yi et al. |
| 6,297,687 B1 | * | 10/2001 | Sugimura .................. 327/536 |

FOREIGN PATENT DOCUMENTS

JP 8-149801 6/1996

* cited by examiner

*Primary Examiner*—Timothy P. Callahan
*Assistant Examiner*—Terry L. Englund
(74) *Attorney, Agent, or Firm*—Antonelli, Terry, Stout & Kraus, LLP

(57) ABSTRACT

A voltage boost circuit operates by applying a power supply voltage to both terminals of a booster capacitance in a discharge period; and, in a charging period which follows the discharge period, by turning on a switching circuit in response to application of one shot pulse thereto, a power supply voltage is applied to one terminal of said booster capacitance, a ground potential is applied to the other one terminal thereof, wherein, during the charging of said booster capacitance, a pulse width of the one shot pulse is adjusted in accordance with a magnitude of the power supply voltage.

6 Claims, 13 Drawing Sheets

VOLTAGE BOOSTER CIRCUIT APPARATUS

This application is a continuation of application Ser. No. 09/421,236, filed Oct. 20, 1999 (and issued as U.S. Pat. No. 6,433,623 on Aug. 13, 2002) and the entire disclosure of which is hereby incorporated by reference.

BACKGROUND OF THE INVENTION

The present invention relates to a voltage booster circuit; and, in particular, the invention relates to a voltage booster (step-up) circuit which is suitable for boosting a power supply in an integrated semiconductor circuit packaged in an integrated circuit, such as a microprocessor and the like, which requires a voltage having a wide operating range.

Recently, for a microprocessor, a demand for low voltage operation and low power consumption has been increasing in order to meet the demand to mount the microprocessor into a portable machine. Namely, in the case of a microprocessor that is normally comprised of CMOS logic circuits, if a power supply voltage which exceeds a threshold voltage Vth of its MOS transistor is available, the logic operation of each CMOS gate which constitutes its logic circuits is ensured, although the operation speed thereof may drop somewhat. If, however, its power supply voltage drops, for example, from 5 volts to below 2 volts, because a voltage across the gate and the source of the MOS transistor approaches the threshold voltage Vth of MOS transistor, the on-resistance of the MOS transistor increases. In particular, in a circuit that uses a transfer gate, in a MOS transistor which constitutes the transfer gate, voltage across the gate and the source may drop below Vth according to the terminal voltage that the transfer gate transfers. In such a case, the on-resistance of its transfer gate becomes extremely great, thereby preventing transfer of a normal voltage level. Further, in a memory module, such as a mask ROM or the like, a drop in the power supply voltage means a drop in a word line drive voltage in a memory mat. Namely, it means that among a plurality of memory MOS transistors constituting the memory mat, for those memory MOS transistors whose gate is connected to the word lines, a voltage across the gate and the source thereof drops to cause a drain current of the memory MOS transistor to attenuate, thereby resulting in an increase in data read time.

Therefore, in order to cope with a case having a specification of a low power supply voltage, for example, below 2 V, a desired operation is ensured even under a low power supply voltage by adoption of a method as described, for example, in JPA Laid-Open No. 8-149801, whereby its low power supply voltage is boosted for driving its transfer gate (MOS side gate) and memory module word lines.

SUMMARY OF THE INVENTION

In the related art described above, a technique is adopted wherein, in principle, a stepped-up voltage, corresponding to twice the power supply voltage VCC which is applied to a power supply terminal, is constantly produced in a boost cycle, including a charging period and a charge transfer period; and, wherein, more specifically, a first terminal of a booster capacitance, which is charged to a level of the power supply voltage VCC, is further charged by applying the power supply voltage via a switching circuit in the charging period thereof, and in the charge transfer period after the charging period, the charge having been accumulated in the booster capacitance is transferred to a load via an output terminal. Therefore, if an integrated semiconductor circuit device having a conventional built-in booster circuit is used as a power supply voltage VCC, which has a relatively high voltage region, for example, 4V or more, a resulting step-up voltage produced by the booster circuit may exceed a withstand voltage of the device (MOS transistor), thereby deteriorating reliability of the system and/or causing breakdown of the devices. However, if a clamp circuit (which is comprised of three PMOS transistors connected in series, and a threshold voltage of each PMOS transistor is set at Vthp) is connected in parallel between the first terminal of the booster capacitance and the terminal of the power supply, namely in parallel with the switching circuit, the booster circuit can be clamped at a voltage of power supply voltage VCC plus 3 times |Vthp|.

Nowadays, however, withstand voltages of the devices are on the decrease along with the trend for devices having finer patterns, and, therefore, an upper limit in the range of power supply voltage VCC and an allowable application voltage (or withstand voltage of the device) are coming into close proximity. Therefore, in the aforementioned voltage clamping method, on the side of the upper limit in the range of power supply voltage VCC, there is a concern that the clamp voltage may exceed its allowable application voltage.

On the other hand, in order to lower the clamp voltage, a voltage drop in the voltage clamp circuit may be minimized, for example, by reducing the number of series connections of PMOS transistors that constitute the voltage clamp circuit. However, this method, if applied to a case having a specification of the power supply voltage VCC in a low voltage range, in contrast to the above, the boost efficiency thereof drops, so that the clamp voltage cannot be reduced simply. Further, as for the clamp voltage, because a fluctuation as great as an integer times the number of connections, i.e., three times in the case of three series connections, results in a condition relative to a fluctuation of a device parameter, i.e., Vthp, of each of the PMOS transistors that constitute its voltage clamp circuit, attainment of compatibility between the low voltage range and the high voltage range for ensuring a high boost efficiency in the low voltage range, while limiting the boost voltage in the high voltage range, is difficult. Still further, because there exists a certain time lag until the voltage clamp is enabled after the voltage clamp circuit is operated, there may arise a peak voltage in excess of its clamp voltage due to that time lag.

Further, as a method for preventing the occurrence of an over-voltage, a depletion type NMOS transistor (hereinafter referred to as a D-MOS) may also be connected between the power supply and the power supply terminal, as disclosed in the aforementioned JPA, so as to clamp the voltage itself to be applied to the power supply terminal. If this method is adopted, in a range of power supply voltage VCC above a threshold voltage |VthD| of the D-MOS, because the voltage of the power supply terminal can be clamped at a level of |VthD|, a boost voltage can certainly be suppressed to approximately twice of |VthD|.

In contrast, however, in a case where the power supply voltage VCC drops below |VthD| a boost voltage twice as great as the power supply voltage VCC is produced. Therefore, if a D-MOS is used, a boost voltage of 2 times |VthD| must exist in a voltage range that has as its low limit voltage a voltage used by a circuit, and as an upper limit voltage, an allowable application voltage. In addition, in consideration of the fluctuation in device parameters as described above, it becomes more difficult to suppress the boost voltage within a predetermined voltage range with a drop in the upper limit of the allowable application voltage. Still further, use of a D-MOS causes increases in the number of mask sheets and processes in the manufacture of semiconductor chips, thereby increasing the cost of manufacture disadvantageously. For example, even when a D-MOS is used in circuits other than the booster circuit mounted on the same chip as their components, unless each D-MOS thereof is operable at the same threshold voltage as the booster circuit device, additional masks and/or additional processes will be required eventually.

An object of the present invention is to provide for a booster circuit apparatus that can regulate a level of voltage boosting according to the magnitude of its power supply voltage.

In order to accomplish the above-mentioned object of the invention, a booster circuit is provided by a method which is comprised of the steps of: applying a power supply voltage to one terminal of a booster capacitance interposed between a power supply terminal and an output terminal in a charging period in a boosting cycle which includes the charging period and a charge transfer period, and applying a reference voltage of a reference potential to the other terminal of said booster capacitance; applying said power supply voltage to the other terminal of said booster capacitance in the charge transfer period thereafter, and transferring charges accumulated in said booster capacitance from said one terminal thereof to said output terminal; and regulating said charging period according to the magnitude of said power supply voltage.

In the construction of the above-mentioned booster circuit, when its power supply voltage is below a predetermined voltage, said charging period is regulated in accordance with a drop of said power supply voltage, and when said power supply voltage is in excess of said predetermined voltage, said charging period is set at zero or regulated to be shortened in accordance with the magnitude of the power supply voltage. Further, instead of regulating the charging period in accordance with the magnitude of the power supply voltage described above, it is possible to regulate the amount of charges to be accumulated in the booster capacitance during the charging period in accordance with the magnitude of the power supply voltage, or to regulate the magnitude of current to be supplied to the booster capacitance during the charging period in accordance with the magnitude of the power supply voltage as well. Still further, it is possible to provide a discharge period prior to the charging period in the boosting cycle, and wherein, during this discharge period, a voltage of the same potential is applied to both the terminals across the boosting capacitance to discharge the charges from the boosting capacitance.

Further, according to another aspect of the invention, a voltage boosting circuit system and a method therefore is provided, in which a power supply voltage is applied to one terminal of a booster capacitance that is interposed between a power supply terminal and an output terminal during a charging period in a boosting cycle which includes the charging period and a charge transfer period, and a voltage of a reference potential is applied to the other terminal of the booster capacitance; application of the power supply voltage to said one terminal of the booster capacitance is stopped for a period of time during the charging period which is determined in accordance with a magnitude of the power supply voltage, and at the same time, a voltage at the reference potential is applied to said one terminal of the booster capacitance so as to discharge the charges in the booster capacitance; and, thereafter, said power supply voltage is applied to the other terminal of said booster capacitance so as to cause the charges accumulated in the booster capacitance to be transferred from said one terminal thereof to said output terminal during the charge transfer period. In construction of this booster circuit of the invention, additional elements may be added which allow for the discharge period during said charging period described above to be adjusted to make the charging period longer if said power supply voltage becomes higher than a pre-set voltage and in accordance with an increase of said power supply voltage, and, on the other hand, if said power supply voltage drops below said preset voltage, allowing for the discharge period during said charging period to be adjusted to become zero.

According to still another aspect of the invention, a booster circuit is provided, which is comprised of a booster capacitance which is interposed between a power supply terminal and an output terminal; a discharge command signal output means for outputting a discharge command signal which specifies said discharge period in the boosting cycle which includes a discharge period, a charging period and a charge transfer period; a charge command signal output means for outputting a charge command signal which specifies said charging period; a control signal output means for outputting a control signal corresponding to a start of said charging period, then, after elapse of a period of time which is determined by a magnitude of the power supply voltage, for stopping outputting said control signal; a first switching means for applying the power supply voltage to one terminal of said booster capacitance in response to a discharge command signal corresponding to a start of said discharge period; a bias switch means for applying the power supply voltage to the other terminal of the booster capacitance until said charge command signal is input, and applying a voltage of a reference potential to the other terminal of the booster capacitance in response to an input of a charge command signal corresponding to a start of said charging period; a second switching means for applying the power supply voltage to said one terminal of the booster capacitance in response to the charge command signal corresponding to the start of the charging period; and a charge transfer means which interrupts its charge transfer path connecting said one terminal of the booster capacitance and said output terminal during a period of time while the control signal from said control signal output means is being output, and establishes said charge transfer path while the output of said control signal from said control signal output means is stopped, and wherein said charge command signal output means adjusts the period of time for generation of said charge command signal in accordance with the magnitude of said power supply voltage. In construction of this booster circuit according to the invention, additional or alternative elements as follows may be added.

(1) In place of the second switching means, a bias means may be provided for applying a bias voltage to the one terminal of the booster capacitance in accordance with the power supply voltage.

(2) Omitting the discharge command signal output means, and in place of the first and the second switching means, another switching means may be provided for applying the power supply voltage to the one terminal of the booster capacitance in response to a control signal.

(3) In place of the second switching means, a bias means may be provided for supplying a bias current corresponding to the power supply voltage to the one terminal of the booster capacitance in response to the control signal.

(4) Said charge command signal output means is comprised so as to allow the period of time for generation of said charge command signal to be adjusted to become longer if the power supply voltage falls below a preset voltage in accordance with a drop of said power supply voltage, and to be adjusted to zero if said power supply voltage exceeds said preset voltage.

According to a still further aspect of the invention, a booster circuit is provided, which is comprised of a booster capacitance which is interposed between a power supply terminal and an output terminal; a charge command output means for outputting a charge command signal which specifies the charging period in a boosting cycle which includes a charging period and a charge transfer period; a control signal output means for outputting a control signal corresponding to a start of said charging period, and thereafter, stopping the outputting of said control signal after elapse of a period of time which is determined by a magnitude of the power supply voltage; a discharge command signal output means for outputting a discharge command signal only for a period of time to be determined by a magnitude of the power supply voltage when said outputting of said control signal is stopped and during said charging period; a first switching means for applying a voltage of a reference potential to one terminal of the booster capacitance in response to said discharge command signal; a second switching means for applying the power supply voltage to the one terminal of the booster capacitance in response to said control signal; a bias switch means for applying the power supply voltage to the other terminal of the booster capacitance before said charge command signal is input, and applying a voltage of a reference potential to the other terminal of the booster capacitance in response to an input of the charge command signal corresponding to a start of said charging period; and a charge transfer means for interrupting a charge transfer path connecting the one terminal of the booster capacitance and said output terminal while the charge command signal from said charge command signal output means is being output, and establishing said charge transfer path therebetween while said outputting of said charge command signal from said charge command signal output means is stopped. In the construction of this booster circuit according to the invention, the following elements may be added thereto.

The discharge command signal output means operates to allow a period of time for generation of said discharge command signal to be adjusted to become longer, if the power supply voltage becomes higher than a preset voltage, in accordance with an increase in said power supply voltage, and to become zero, if the power supply voltage becomes smaller than said preset voltage.

According to the above-mentioned features of the invention, because one terminal of the booster capacitance is supplied with the power supply voltage, while the other terminal thereof is supplied with the voltage of the reference potential, and the charging period is adjusted in accordance with the magnitude of the power supply voltage, it becomes possible to regulate the level of a step-up voltage in accordance with the magnitude of the power supply voltage. In particular, when the power supply voltage is below the preset voltage, the charging period is adjusted to become longer corresponding to a drop in the power supply voltage. When the power supply voltage exceeds the preset voltage, the charging period is adjusted to become zero or shortened corresponding to an increase in the power supply voltage, thereby making it possible to generate a step-up voltage at a level corresponding to a prescribed power supply voltage when the power supply voltage drops below the preset voltage, and to adjust the level of a step-up voltage to zero when the power supply voltage exceeds the preset voltage, or suppress the same in accordance with an increase in the power supply voltage. Therefore, a preferred boosting efficiency can be attained without the boosting level exceeding the allowable voltage.

More particularly, in the case when the charging period is adjusted in accordance with the magnitude of the power supply voltage, a step-up voltage HVs which appears at the one terminal of the booster capacitance, assuming under no load condition or a saturated condition for the step-up voltage saturated by indefinite cycles of boosting, is expressed by the following equation (1), $$HVs = VCC + VC1 \quad (1),$$

where VCC is a power supply voltage, and VC1 is a potential difference immediately prior to the boosting operation between both the terminals across the boosting capacitance. Assuming that an accumulated charge in booster capacitance C1 is Q1, and the coefficient of capacitance is C1, the potential difference VC1 between both the terminals thereof is expressed by equation (2)

$$VC1 = Q1/C1 \quad (2).$$

In the above equation (2), by increasing or decreasing Q1 in accordance with a magnitude of power supply voltage VCC, the level of step-up voltage HVs can be controlled appropriately. Namely, for example, in a higher voltage region where the power supply voltage VCC exceeds the preset voltage level, if VC1 is reduced by decreasing Q1, the level of step-up voltage HVs can be suppressed to a smaller value. Further, in a lower voltage region where the power supply voltage VCC is below the preset voltage level, if VC1 is increased by increasing Q1 in contrast to the above, an appropriate level of step-up voltage HVs can certainly be maintained. Further, the charge Q1 of booster capacitance C1 which can be specified by charge current IC and its conduction period, namely, by charging period tw, is expressed by the following equation (3)

$$Q1 = IC \times tw \quad (3).$$

In the above equation (3), by specifying the charging period tw belonging to the boosting cycle, such as to reduce tw in the higher voltage region where the power supply voltage VCC exceeds the preset voltage, and to increase tw in the lower voltage region, where power supply voltage VCC is below the preset voltage level, the charge Q1 can be adjusted to decrease or increase, thereby allowing for the level of step-up voltage HVs to be regulated by the charging period.

BRIEF DESCRIPTION OF THE DRAWINGS

These and other objects, features and advantages of the invention will appear more fully during the following discussions of the accompanying drawings, wherein.

DESCRIPTION OF PREFERRED EMBODIMENTS

Figure 1:
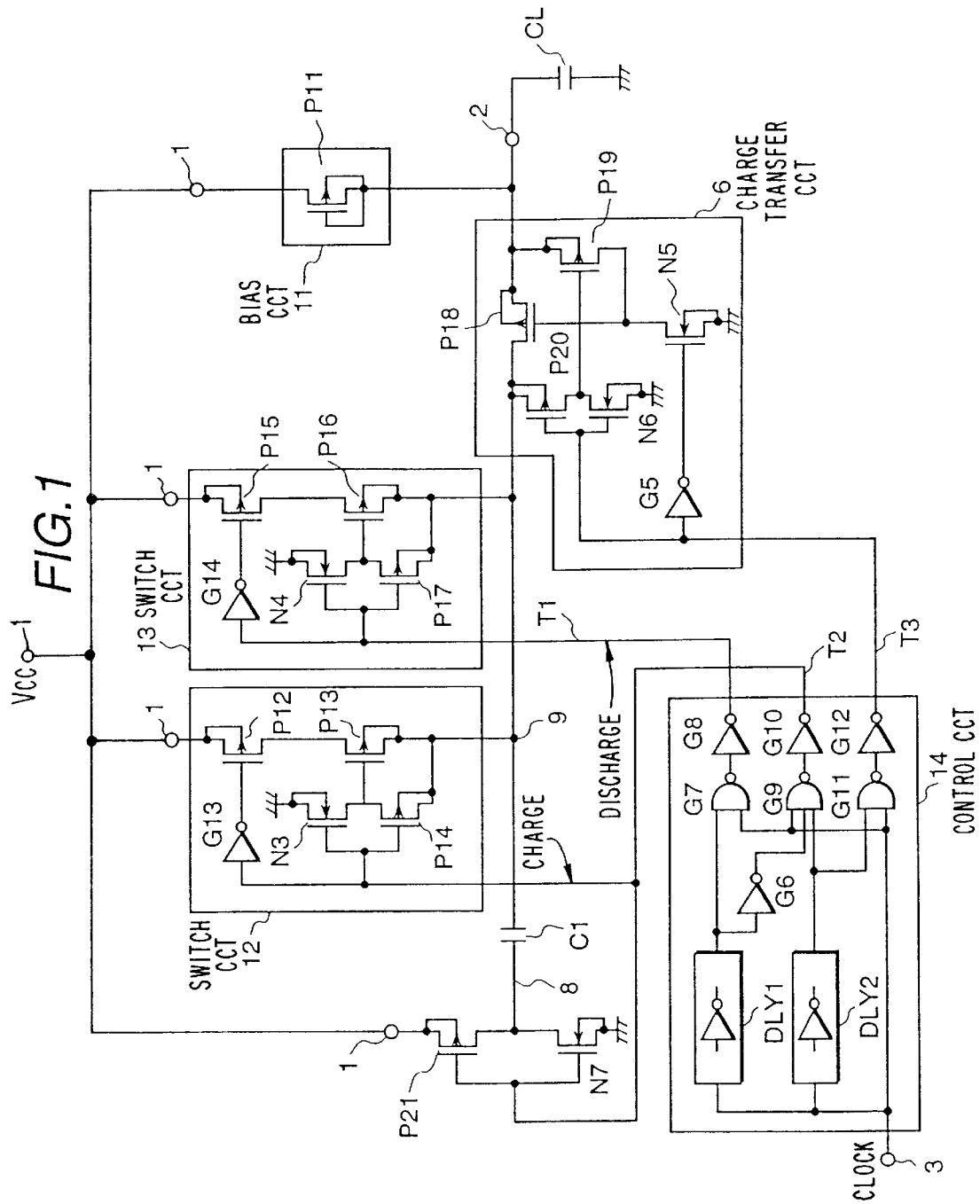
FIG. 1 is a schematic circuit diagram of one embodiment according to the invention.

One preferred embodiment of the invention will be described with reference to the accompanying drawings. FIG. 1 is a schematic circuit diagram illustrating a first embodiment of the invention. In FIG. 1, a step-up (booster) circuit of the invention is comprised of: a booster capacitance C1 which is interposed between a power supply terminal 1 and an output terminal 2; a control circuit 14 which is connected to a boost clock signal input terminal 3; a charge transfer circuit 6 which is interposed between booster capacitance C1 and output terminal 2; a bias circuit 11 which is interposed between power supply terminal 1 and output terminal 2; switching circuits 12, 13 interposed between power supply terminal 1 and a node 9; and PMOS transistor P21, NMOS transistor N7 which are interposed between power supply terminal 1 and a reference potential (ground potential), and wherein one terminal of booster capacitance C1 is connected to node 9, and the other terminal thereof is connected to respective drains of transistors P21, N7 via node 8, and wherein load capacitance CL is connected to output terminal 2. Further details of the respective circuits will be described in the following.

Figure 2:
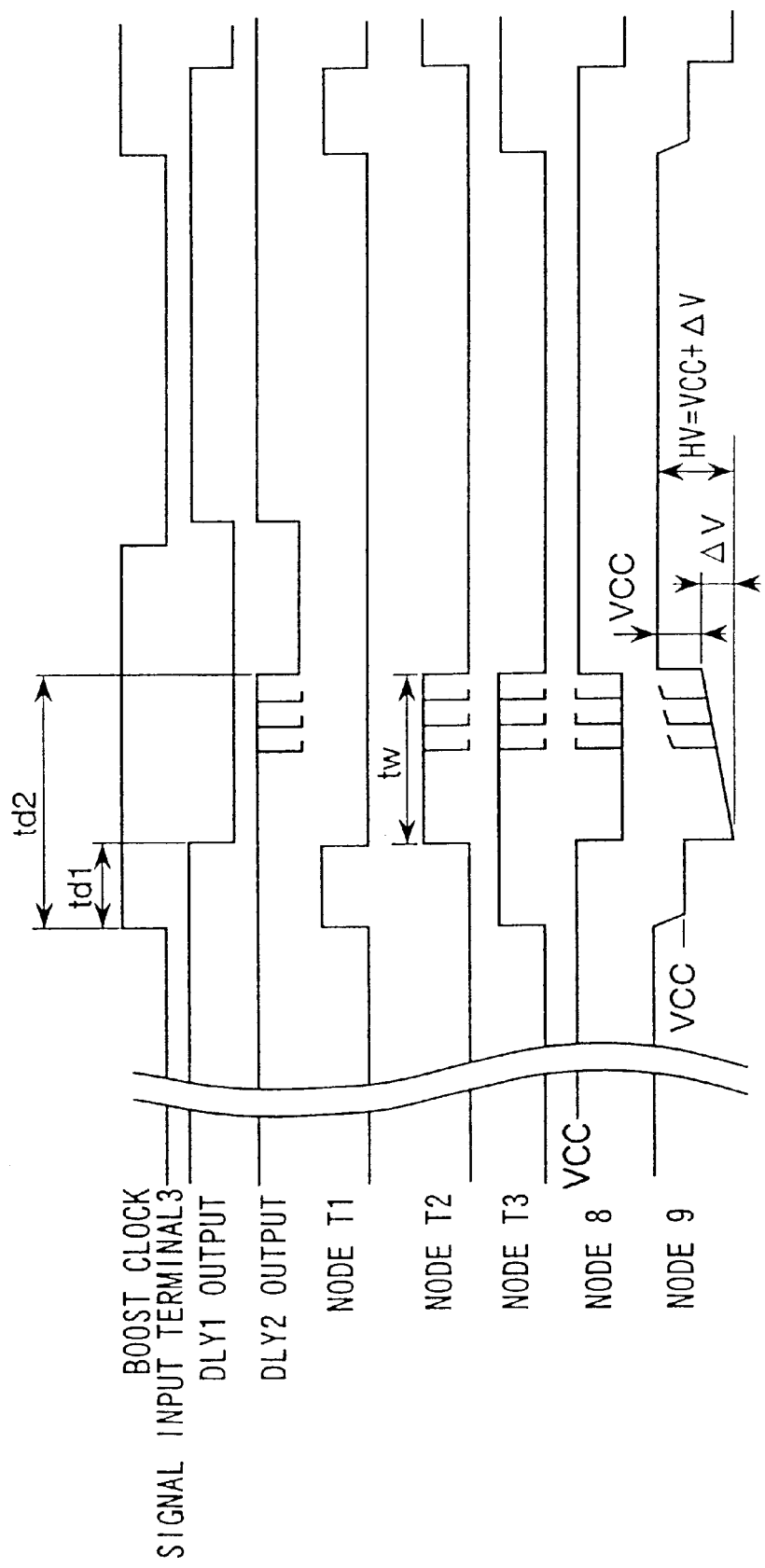
FIG. 2 is a voltage waveform diagram illustrating the operation of the circuit diagram of FIG. 1.

Control circuit 14 is arranged to output a pulse signal from each of nodes T1, T2 and T3 which are output terminals, in response to a boost (step-up) clock signal to be input to input terminal 3 during each boost cycle, which includes a discharge period, a charging period and a charge transfer period. For example, as indicated in FIG. 2, in response to a boost clock signal, a high level signal is output to node T1 as a discharge command signal that specifies the discharge period; a high level signal is output to node T2 as a charge command signal that specifies the charging period; a high level control signal is output from node T3 corresponding to a start of the charging period; and thereafter, the outputting of the control signal is stopped after elapse of a period of time which is determined by the magnitude of power supply voltage VCC.

More specifically, control circuit 14 is comprised of: first delay circuit DLY1, the input of which is connected to input terminal 3; a second delay circuit DLY2, the input of which is connected to input terminal 3; a NAND gate G7, one of the inputs of which is connected to an output of the first delay circuit DLY1, and the other one of the inputs of which is connected to input terminal 3; an inverter G8, the input of which is connected to the output of NAND gate G7, and the output of which is connected to node T1; an inverter G6, the input of which is connected to the output of the first delay circuit DLY1; a three-input NAND gate G9, a first input of which is connected to the output of the second delay circuit DLY2, a second input of which is connected to the output of inverter G6, and a third input of which is connected to input terminal 3; an inverter G10, an input of which is connected to the output of three-input NAND gate G9, and the output of which is connected to node T2; a NAND gate G11, one of the inputs of which is connected to the output of the second delay circuit DLY2, and the second input of which is connected to input terminal 3; and an inverter G12, the input of which is connected to the output of NAND gate G11, and the output of which is connected to node T3. By way of example, here, the first delay circuit DYL1 and the second delay circuit DLY2 are constructed to have a logical polarity to produce a reverse output relative to their inputs, i.e., from input terminal 3. The second delay circuit DLY2 is designed to have a greater delay amount, compared to the first delay circuit DLY1, in the lower voltage region where a specific power supply voltage is below the preset voltage, and further to have a greater dependency for its delay amount on power supply voltage VCC. Namely, in the higher voltage region where power supply voltage VCC is in excess of the preset voltage level, its delay amount is set to become smaller than that of the first delay circuit DYL1. Their circuit configurations will be described more specifically later.

The charge transfer circuit 6 is provided as a charge transfer means which interrupts the charge transfer path between node 9 and output terminal 2 while a high level control signal is being output from control circuit 14 via node T3, and establishes the charge transfer path connecting node 9 and output terminal 2 while the output of the high level control signal from control circuit 14 via node T3 is stopped.

More specifically, the charge transfer circuit 6 is comprised of: an inverter G5, the input of which is connected to node T3; a PMOS transistor P18, the drain and substrate of which are connected to output terminal 2, and the source of which is connected to node 9; a PMOS transistor P19, the source and substrate of which are connected to output terminal 2, and the drain of which is connected to the gate of PMOS transistor P18; a NMOS transistor N5, the gate of which is connected to the output of inverter G5, the drain of which is connected to the gate of PMOS transistor P18, and the source and substrate of which are grounded; a PMOS transistor P20, the source and substrate of which are connected to node 9, and the drain of which is connected to the gate of PMOS transistor P19; and an NMOS transistor N6, the drain of which is connected to the gate of PMOS transistor P19, the source and substrate of which are grounded, and the gate of which is connected via a common connection to the gate of PMOS transistor P20 and to the input of inverter G5.

The bias circuit 11 is provided as a bias means for applying a bias voltage to output terminal 2 corresponding to the magnitude of power supply voltage VCC. More specifically, it is comprised of a PMOS transistor P11, the source of which is connected to power supply terminal 1, and the drain, gate and substrate of which are connected to output terminal 2. This bias circuit 11 can supply a bias voltage for initial charging of a load capacitance CL connected to output terminal 2 so as to speed up the rise of a step-up voltage immediately after the input of a boost clock signal.

Switching circuit 13 is provided to serve as a first switching means for applying the power supply voltage to the one terminal of the step-up capacitance C1 in response to the discharge command signal (a high level signal output from node T1) corresponding to the start of the discharge period.

More specifically, switching circuit 13 is comprised of: inverter G14, the input of which is connected to node T1; PMOS transistor P15, the gate of which is connected to the output of inverter G14, and the source and substrate of which are connected to power supply terminal 1; PMOS transistor P16, the source of which is connected to the drain of PMOS transistor P15, the drain and substrate of which are connected to node 9; PMOS transistor P17, the source and substrate of which are connected to node 9, and the drain of which is connected to the gate of PMOS transistor P16; and NMOS transistor N4, the source and substrate of which are connected to earth potential, the drain of which is connected to the gate of PMOS transistor P16, and the gate of which is connected to the gate of PMOS transistor P17 and to the input of inverter G14 via a common connection.

Switching circuit 12 is provided to serve as a second switching means for applying the power supply voltage to the one terminal of the booster capacitance C1 in response to the charge command signal (a high level signal output from node T2) corresponding to the start of the charging period.

More specifically, switching circuit 12 is comprised of: inverter G13, the input of which is connected to node T2; PMOS transistor P12, the gate of which is connected to the output of inverter G13, and the source and substrate of which are connected to power supply terminal 1; PMOS transistor P13, the source of which is connected to the drain of PMOS transistor P12, and the drain and substrate of which are connected to node 9; PMOS transistor P14, the source and substrate of which are connected to node 9, and the drain of which is connected to the gate of PMOS transistor P13; and NMOS transistor N3, the source and substrate of which are connected to GND, the drain of which is connected to the gate of PMOS transistor P13, and the gate of which is connected to the gate of PMOS transistor P14, as well as to the input of inverter G113 via a common connection.

PMOS transistor P21 and NMOS transistor N7 are constructed as a bias switching means which applies the power supply voltage to the other terminal (node 8) of booster capacitance C1 until a charge command signal is input, and alternatively applies a voltage of a reference potential to the other terminal of booster capacitance C1 in response to an input from node T2 in the form of a charge command signal corresponding to the start of the charging period.

More specifically, the source of transistor P21 is connected to power supply terminal 1, the drain thereof is connected to node 8, and the gate thereof is connected to node T2, whereas the drain of transistor N7 is connected to node 8, the source and substrate thereof are connected to GND, and the gate thereof is connected to node T2.

Now, with reference to FIG. 2, the operation of the booster circuit of FIG. 1 will be described.

When the level of the input terminal 3 is at a low level, all of the outputs of NAND gates G7, G11 and three-input NAND gate G9 become a high level, and all nodes T1, T2 and T3 are at a low level. Thereby, PMOS transistor P21, the gate of which is connected to node T2, turns to the on-state, thereby causing node 8 to be at the potential of the power supply terminal 1, namely, node 8 is biased to power supply voltage VCC.

At this time, in switching circuit 12, the output of inverter G13 becomes a high level in response to node T2, which is at low level. At this time, because PMOS transistor P12 is in the off-state, a current flowing from power supply terminal 1 to node 9 is interrupted. Further, PMOS transistor P14, the gate of which is connected to node T2, is in the on-state, thereby biasing the gate of PMOS transistor P13 to a potential of node 9. Thereby, a current flowing from node 9 to power supply terminal 1 is also interrupted. Therefore, switching circuit 12 is in the off-state with both currents flowing in both directions between power supply terminal 1 and node 9 interrupted. Further, in switching circuit 13, which adopts the same circuit. configuration as in switching circuit 12, both PMOS transistors P15 and P16 are in the off-state in response to node T1, which is at low level, thereby interrupting both currents flowing in both directions between power supply terminal 1 and node 9, and thus causing switching circuit 13 to be in the off-state, the same as switching circuit 12.

On the other hand, in charge transfer circuit 6, in response to node T3, which is at a low level, an output of inverter G5 becomes a high level to cause NMOS transistor N5 to become on. Due to the on-state of NMOS transistor M5, the gate of PMOS transistor P18 becomes low level, i.e., at GND potential (a reference potential), thereby causing PMOS transistor P18 to be in the on-state, and thereby causing the potential of node 9 to be transferred to output terminal 2. Further, PMOS transistor P20, the gate of which is connected to node T3, is in the on-state so as to bias the gate of PMOS transistor P19 to the potential of node 9. Because the potential of node 9 is at the same potential as that of output terminal 2 due to the on-state condition of PMOS transistor P18, the gate and the source of PMOS transistor P19 are at the same potential, thereby causing PMOS transistor P19 to be in the off-state, and thereby interrupting a current flowing from output terminal 2 to NMOS transistor N5.

When the input terminal 3 is at a low level, the circuit is in a boost mode (charge transfer period) for obtaining a step-up voltage on the side of node 9 by raising the terminal on the side of node 8 of booster capacitance C1 to power supply voltage VCC, wherein a leak of charges from node 9 to power supply terminal 1 is prevented by setting both switching circuits 12 and 13 to the off-state, and the raised potential of node 9 is transferred to output terminal 2 by setting the charge transfer circuit 6 to the on-state. At this moment, in bias circuit 11, which is connected to output terminal 2, because PMOS transistor P11 interrupts a current flowing from output terminal 2 to power supply terminal 1, the raised potential at the output terminal 2 is maintained.

In an initial state before a boost clock signal is input to input terminal 3, output terminal 2 and node 9 are arranged to be charged by PMOS transistor P11 provided in bias circuit 11. The charge voltage at this time is lower than the power supply voltage VCC by the threshold voltage |vthp| of PMOS transistor P1, or by a forward voltage drop FVD of a parasitic diode between the source and substrate of PMOS transistor P11. Further, when this initial charge voltage needs to be the same potential as that of power supply voltage VCC, this condition can be accomplished by provision of a bias circuit 11, which is comprised of the same configuration, for example, as that of switching circuit 12, and by providing a control input of a high level prior to input of a booster clock signal, thereby causing its transistors to be in the on-state corresponding to PMOS transistors P12, P13 as in switching circuit 12. Then, after the input of the booster clock signal, it may be arranged such that its control input becomes low level to cause its transistors to be maintained in the off-state.

Then, when the level of the boost clock signal input to input terminal 3 changes to a high level, each output from the first delay circuit DYL1 and the second delay circuit DLY2 changes to a low level, each with a respective time delay of td1 and td2, as indicated in FIG. 2. Here, between delay times td1 and td2, there is a relation that td1<td2 as indicated in FIG. 2. Thereby, with regard to the NAND gate G7, both outputs of the boost clock signal and the first delay circuit DYL1 are at a high level, and so, in an overlap period of these high level outputs, G7 outputs a one shot pulse of low level with a width corresponding to delay time td1. Thereby, a high level reverse one shot pulse inverted from the low level one shot pulse by inverter G8 is output as a discharge command signal to node T1 for a period of time corresponding to delay time td1. At this time, with regard to the three-input NAND gate G9, because a reverse signal of the output from the first delay circuit DYL1 inverted by inverter G6 is input to one of its inputs, G9 reaches an active-state only after elapse of delay time td1, namely, all inputs thereof become high level at that time, thereby causing its output to transit to low level. Then, at the time when the output of the second delay circuit DLY2 changes to low level, the same returns to high level. Therefore, the three-input NAND gate G9 outputs a low level one shot pulse for a period of time equal to the difference of delay times between the first and the second delay circuits DYL1 and DLY2, namely, td2−td1, thereby causing a high level reverse one shot pulse obtained by inverting the low level one shot pulse by inverter G10 to be output as a charge command signal to node T2 for a period of time tw corresponding to a delay time td2−td1. Further, NAND gate G11 outputs a low level one shot pulse having a width corresponding to an overlap period of high levels between the boost clock signal and the output of the second delay circuit DLY2, namely, corresponding to delay time td2, thereby outputting as a control signal a high level one shot pulse obtained as reversed from the low level one shot pulse by inverter G12 for a period of time corresponding to delay time td2.

Each circuit component of the invention is controlled by a respective one shot pulse output from nodes T1, T2 and T3 as will be described in the following.

In the first place, by transition of the levels of node T1 from low level to high level, the discharge period is started. In switching circuit 13, which inputs the pulse of node T1 as its control input, an output of inverter G14, the input of which is connected to node T1, becomes low level so as to cause PMOS transistor P15 to be in the on-state. Further, NMOS transistor N4, the gate of which is connected to node T1, becomes on-state thereby causing the gate of PMOS transistor P16 to become low level, thus causing PMOS transistor P16 to be in the on-state as well. By turning on the PMOS transistors P15 and P16 in this switching circuit 13, the path between node 9 and power supply terminal 1 is short-circuited, thereby causing node 9 to be biased to the potential of power supply voltage VCC.

At this moment, because the signal of node T2 is also at low level, PMOS transistor P21 is in the on-state, thereby causing a potential on the side of node 8 to be biased to power supply voltage VCC. Therefore, the difference of potentials between both terminals of boosting capacitance C1 is 0 V, and the boosting capacitance C1 is in a discharged state. If the potential of node 9 immediately before transition of node T1 to high level is at a step-up potential greater than power supply voltage VCC, a discharge current of boost capacitance C1 will flow from node 9 to power supply terminal 1, thereby discharging the capacitance C1.

Further, in the charge transfer circuit 6, in response to a signal of node T3 which becomes high level at the same time as transition of node T1 to high level, an output of inverter G5, the input of which is connected to node T3, becomes low level. At this time, NMOS transistor N5, the gate of which is connected to an output of inverter G5, becomes off-state, and at the same time, NMOS transistor N6, the gate of which is connected to node T3, becomes on-state, thereby causing the gate of PMOS transistor P19 to become low level. Thus, PMOS transistor P19 becomes on-state. Thereby, because the gate of PMOS transistor P18 is biased to the potential of output terminal 2, PMOS Transistor P18 interrupts a current flowing from output terminal 2 to node 9. Therefore, even if there occurs a potential drop at node 9 due to connection thereof via switching circuit 13 to the potential of power supply voltage VCC, no charge transfer from output terminal 2 to node 9 will take place, thereby ensuring a raised potential immediately prior to boosting to be maintained at output terminal 2.

Further, because node T2 maintains its low level during a period while node T1 keeps a high level, switching circuit 12 is in the off-state, the same as in the case where its boost clock signal input is at a low level.

In the following, a case will be considered where, after elapse of delay time td1, the level of node T1 returns to low level, and at the same time, the level of node T2 changes to high level. As for node T3, because it does not change until node T2 returns to its low level, the charge transfer circuit 6 maintains the above-mentioned state. Further, with regard to switching circuit 13, in response to the condition wherein the level of node T1 has returned to low level, switching circuit 13 returns to the off-state, the same as in the case where the level of the boost clock signal is at a low level.

On the other hand, if the level of node T2 shifts to a high level, a charging period is started, and in switching circuit 12, which receives a pulse from node T2 as its control input, the output of inverter G13, the input of which is connected to node T2, becomes low level. At this moment, PMOS transistor P12 the gate of which is connected to the output of inverter G13, becomes on-state. Also, NMOS transistor N3, the gate of which is connected to node T2, becomes on-state, and the gate of PMOS transistor P13 becomes low level so as to cause the PMOS transistor P13 to be in the on-state as well. By turning on the PMOS transistors P12, P13 in this switching circuit 12, a conduction state is formed between node 9 and power supply terminal 1.

Further, at this same time, NMOS transistor N7, the gate of which is connected to node T2, becomes on, and the PMOS transistor P21 becomes off so as to drop the potential of node 8 from that of power supply voltage VCC to GND potential.

Immediately before shifting of node T2 to a high level, because the booster capacitance C1 is in a discharged state with a potential difference being 0 V between both the terminals thereof, together with shifting of node 8 to ground potential, the potential of node 9 is also caused to drop to ground potential. At this time, however, because switching circuit 12 becomes on-state at the same time, as described above, a charge current is allowed to flow from power supply terminal 1 toward node 9 to charge booster capacitance C1. Thereby, in company with the above, the potential of node 9 is caused to increase gradually from ground potential, and this increased voltage of node 9, that is, the potential difference ΔV between both terminals of booster capacitance C1, is expressed by the following equation (4), $$\Delta V = IC \times tw/C1 \quad (4),$$

where, IC is a charge current flowing from power supply terminal 1 toward node 9 via switching circuit 12, tw is an ON-period (charging period) of switching circuit 12, that is, a period of high level of node T2, which corresponds to a delay time td2−td1, as described with reference to FIG. 2, and C1 is a capacitance coefficient of booster capacitance C1.

Subsequently, when the levels of nodes T2 and T3 return to low levels, switching circuit 12 returns to the off-state, the same as in the input state of the boost clock signal of low level, thereby interrupting currents in both directions between power supply terminal 1 and node 9. Switching circuit 13 is also in an off-state because there occurs no change in node T1, which is at a low level. Therefore, the state of node 9 becomes isolated from power supply terminal 1.

Further, by transition of node T2 to its low level, PMOS transistor P21, the gate of which is connected to node T2, becomes on, and NMOS transistor N7 is turned to the off-state, thereby causing the potential of node 8 to increase from ground potential to power supply voltage VCC. Assuming that the potential difference produced between both the terminals of booster capacitance C1 by the above-mentioned charging operation immediately before this is ΔV, and that this charge is preserved, together with an increase of potential of node 8 to the power supply voltage, the potential of node 9 can increase as high as VCC +ΔV.

Further, at this time, by the return of node T3 to its low level, in charge transfer circuit 6, the state thereof returns to the same state as in the input state of the boost clock signal of low level so as to cause the PMOS transistor P18 to be in the on-state, thereby transferring a stepped-up potential of node 9 to output terminal 2. At this instance, if the terminal voltage of load capacitance CL, namely, the voltage of output terminal 2, is lower than VCC+ΔV, the charge of booster capacitance C1 is distributed to load capacitance CL, therefore, the potentials of node 9 and output terminal 2 drop lower than VCC+ΔV. However, because the load capacitance CL has increased its charge, compared to that before the distribution of the charge of C1, its terminal voltage, namely, the voltage of output terminal 2 is considered to have increased. Therefore, by repetition of this charge distribution, the voltage of output terminal 2 is gradually increased finally to reach a saturated state of VCC+ΔV, and no increase above that level will occur. That is, in FIG. 2, a stepped-up potential HV obtained at node 9 when the levels of nodes T2 and T3 are shifted from high level to low level is expressed to be HV=VCC+ΔV, which indicates a value obtained in the above-mentioned saturated state.

As described above, one cycle of the step-up operation of the invention is completed when all levels of the one shot pulses generated from nodes T1, T2 and T3 return to their low levels. At this instance, respective circuit components of the invention, such as switching circuits 12 and 13, PMOS transistor P21, NMOS transistor N7, charge transfer circuit 6 and the like, are caused to return to their initial state of operation where the level of the boost clock signal becomes low.

Even if the boost clock signal subsequently changes to the low level, because there occurs no change in signal status of nodes T1, T2 and T3, the above-mentioned status is maintained until the level of a subsequent boost clock signal shifts to the high level.

Then, when the level of the boost clock signal is shifted again to the high level, a one shot pulse is again produced at nodes T1, T2 and T3, respectively, thereby repeating a series of operations, including the charging and discharging of the booster capacitance C1 and the charge distribution to the load capacitance CL, such that the terminal voltage of load capacitance CL, that is, the potential of output terminal 2, is stepped up.

A stepped-up output voltage finally obtained at output terminal 2 in the aforementioned operation is determined by a charged voltage in booster capacitance C1 which is charged during the high level period of the one shot pulse of node T2, or by the potential difference ΔV between both terminals thereof. Further, this value of ΔV, as indicated in the above equation (4), is proportional to "tw" which is the duration of the high level state of the one shot pulse produced from node T2. Further, "tw" has a time width equal to a difference between the time delay td1 of the first delay circuit DLY1 and the time delay td2 of the second delay circuit DLY2 in control circuit 14, i.e., a time width corresponding to td2−td1. Thus, if it is set such that a dependency of the second delay circuit DLY2 on power supply voltage VCC is greater, and that td2 decreases faster than td1 with an increase of power supply voltage VCC, as indicated in FIG. 2, the higher the power supply voltage VCC becomes, the smaller the delay of td2 with respect to td1 becomes, that is, tw becomes smaller. Along with this decrease of tw, because an amplitude of ΔV is reduced, it is ensured that, when the power supply voltage VCC increases to a higher voltage, the step-up output voltage will be suppressed to a smaller value.

Still further, when the power supply voltage VCC increases (a specification of the power supply voltage is raised) such that td2−td1, "tw", becomes 0, no more one shot pulse appears in node T2. In this state, no step-up operation is executed because the NMOS transistor N7 is not turned on to bias node 8 to the ground potential, and switching circuit 12 is not turned on to charge booster capacitance C1. In this case, because node 9 is supplied with power supply voltage VCC via switching circuit 13, which operates in response to the one shot pulse from node T1, the output terminal 2 is also caused to output the potential of the power supply voltage VCC therefrom.

Namely, according to this embodiment of the invention, when the specification of power supply voltage VCC is set in the high voltage region, its step-up output voltage is automatically suppressed or the power supply voltage VCC is output by stopping the step-up operation thereof. On the other hand, when the specification of power supply voltage VCC is set in the low voltage region which is below its preset voltage, there holds a relation that td2>td1, and a difference between td2 and td1, i.e., tw, increases with a drop of the power supply voltage VCC so as to lengthen the period of time for charging the booster capacitance C1. As a consequence, ΔV becomes greater, such that production of an adequate step-up output voltage in the low voltage region of power supply voltage VCC is ensured.

Figure 3:
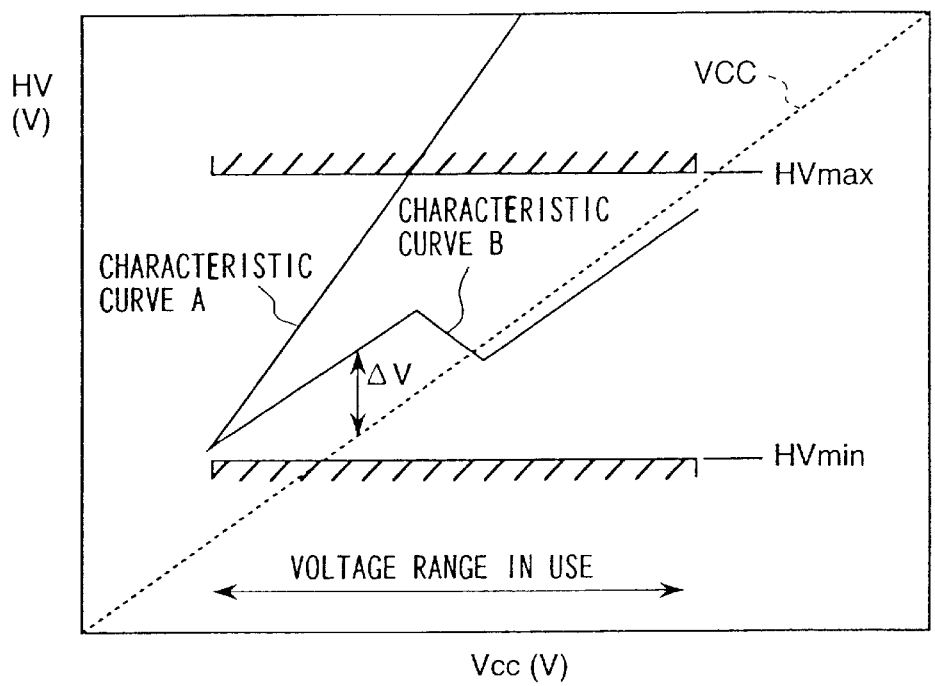
FIG. 3 is a graph showing a comparison of output characteristics of the circuits between the prior art and the present invention.

Now, correlation characteristics of the step-up output voltage HV relative to the power supply voltage VCC according to the embodiment of the invention are illustrated in FIG. 3 in comparison with those of prior art.

In FIG. 3, the abscissa represents power supply voltage VCC and the ordinate represents the stepped-up output voltage HV, respectively. Further, HVmax in the drawing depicts a maximum voltage allowable, which is defined by the withstand voltage and the like of elements, and which determines an upper limit of the stepped-up output voltages. HVmin depicts a minimum voltage required for the load circuit, which uses a step-up output voltage, and is a bottom limit value of the stepped-up output voltages. Therefore, it is necessary for the stepped-up output voltages to be within a range between HVmax and HVmin in a full range of power supply voltage VCC to be used. Here, in FIG. 3, characteristic curve A depicts a typical prior art booster circuit, and characteristic curve B depicts characteristics of the embodiment of FIG. 1.

As shown in FIG. 3, in a specific requirement wherein the upper limit of the range of power supply voltage VCC and HVmax resides in a close proximity, as apparent from characteristic curve A indicative of the prior art, which produces a step-up voltage basically as high as twice the power supply voltage VCC, there is generated a step-up voltage in excess of HVmax at a relatively low value of power supply voltage VCC. In contrast, according to the embodiment of the invention, as indicated by curve B, the step-up voltage is suppressed to VCC+ΔV. Further, when the power supply voltage VCC exceeds a preset voltage, because charging of the booster capacitance C1 is stopped, its output becomes approximately equal to the power supply voltage VCC; therefore, even on the side of the upper limit in the range of use of the power supply voltage VCC, a step-up output that satisfies HVmax can be obtained.

Further, in the foregoing description of the embodiment of the invention, the arrangements of the switching circuits 12 and 13 indicated in FIG. 1 are not essential, and other arrangements or modifications thereof can be used so long as they can realize the same functions described above, and such modifications should be construed as being within the scope of the invention.

The same applies to control circuit 14. In the foregoing description thereof, according to the embodiment of the invention, two delay circuits DYL1 and DLY2 are provided, and the charging period for charging the booster capacitance C1 is defined using a delay time difference between td1 and td2; however, the invention is not limited thereto, and other arrangements or modifications thereof can be adopted within the scope of the invention so long as they can allow for the discharge period for booster capacitance C1 (corresponding to delay time td1) to be ensured, and provide for use of a charge command signal (a signal corresponding to "tw" indicated in FIG. 2) which can adjust its charging period corresponding to the value of the power supply voltage VCC. According to the configuration of this embodiment of the invention, however, in the high voltage region of power supply voltage VCC, by establishing a relation such that the charge period is based on td2−td1, as described above, a charge period for charging the booster capacitance C1 can be easily set to zero, thereby completely stopping the booster operation, which is very effective and advantageous for preventing the occurrence of over-voltages.

As described above, a booster circuit according to the embodiment of the invention has been provided, the features of which reside in that its step-up output voltage can be automatically regulated in accordance with a value of the power supply voltage VCC, such that in the low voltage region of the power supply voltage VCC where boosting of its voltage is required, an adequate stepped-up voltage is obtained, and, in the high voltage region thereof, where no stepped-up voltage is needed, the boosting thereof is suppressed so as to satisfy a preset range of stepped-up voltages. Further, according to the invention, because the object thereof is not to clamp a stepped-up voltage which has been produced, but is to regulate the step-up voltage itself, a booster circuit that can prevent the occurrence of an over-voltage within the circuit thereof is provided. Still further, the booster efficiency in the charge transfer circuit 6 can be improved substantially. Furthermore, because the charging and discharging of the booster capacitance C1 are carried out independently by switching circuits 12 and 13, respectively, optimization in respective circuits can be realized independently, for example, for minimizing the discharge period.

Now, with reference to FIG. 4, the configuration of the delay circuits DLY1 and DLY2 in the control circuit 14 will be described more specifically.

Figure 4:
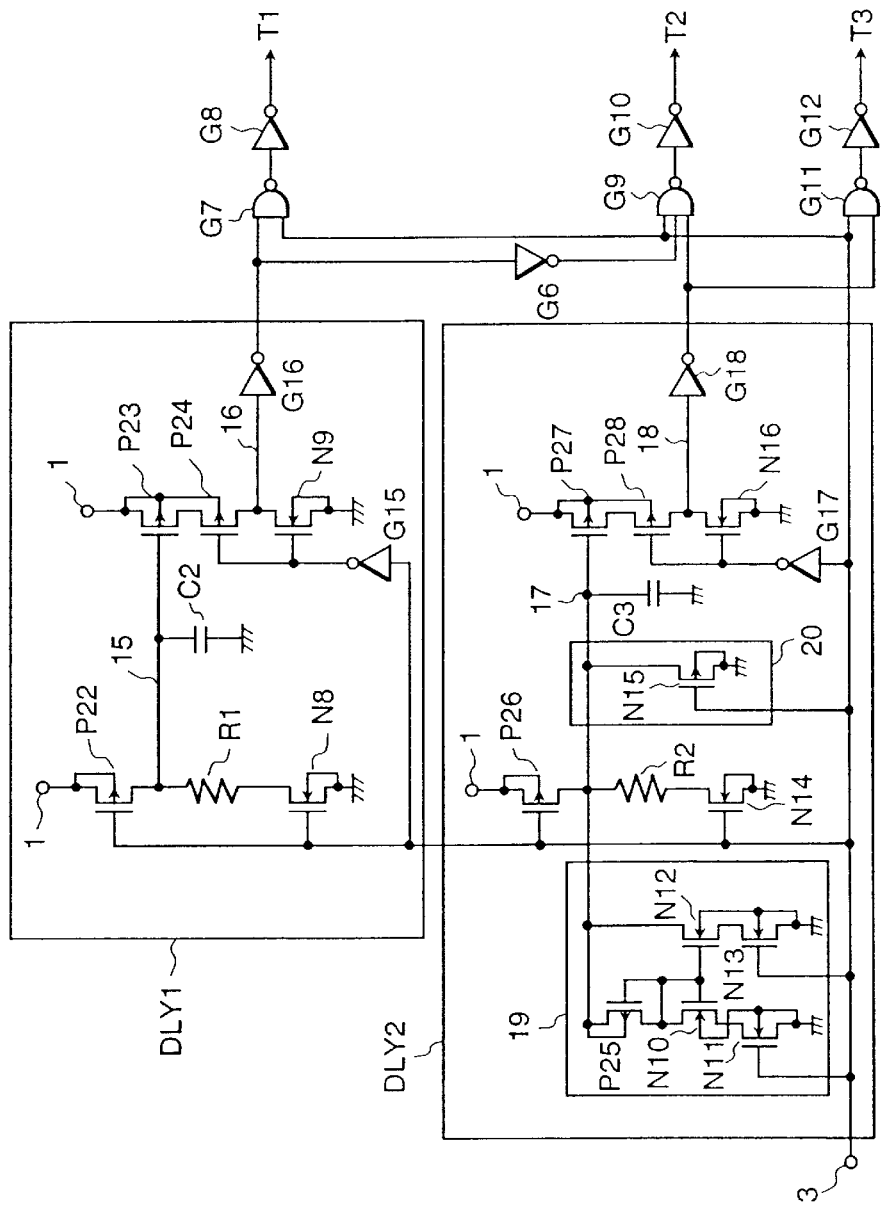
FIG. 4 is a schematic circuit diagram of a control circuit according to the invention.

In FIG. 4, the first delay circuit DYL1 is comprised of: PMOS transistor P22, the source and substrate of which are connected to power supply terminal 1, the gate of which is connected to input terminal 3, and the drain of which is connected to node 15; NMOS transistor N8, the source and substrate of which are connected to GND, the gate of which is connected to input terminal 3, and the drain of which is connected to node 15 via a resistance R1; capacitance C2 connected between node 15 and GND; PMOS transistor P23, the source and substrate of which are connected to power supply terminal 1, and the gate of which is connected to node 15; PMOS transistor P24, the source of which is connected to the drain of PMOS transistor P23, the substrate of which is connected to power supply terminal 1, and the drain of which is connected to node 16; inverter G15, the input of which is connected to input terminal 3; NMOS transistor N9, the source and substrate of which are connected to GND, the drain of which is connected to node 16, and the gate of which is connected to the gate of PMOS transistor P24, as well as to the output of inverter G15; and inverter G16, the input of which is connected to node 16, and wherein an output of inverter G16 provides an output from the first delay circuit DYL1.

Further, the second delay circuit DLY2 is comprised of: PMOS transistor P26, the source and substrate of which are connected to power supply terminal 1, the gate of which is connected to input terminal 3, and the drain of which is connected to node 17; NMOS transistor N14, the source and substrate of which are connected to GND, the gate of which is connected to input terminal 3, and the drain of which is connected to node 17 via a resistance R2; capacitance C3 connected between node 17 and GND; PMOS transistor P27, the source and substrate of which are connected to power supply terminal 1, and the gate of which is connected to node 17; PMOS P28, the source of which is connected to the drain of PMOS transistor P27, the substrate of which is connected to power supply terminal 1, and the drain of which is connected to node 18; inverter G17, the input of which is connected to input terminal 3; NMOS transistor N16, the source and substrate of which are connected to GND, the drain of which is connected to node 18, and the gate of which is connected to the gate of PMOS transistor P28, as well as to the output of inverter G17; inverter G18, the input of which is connected to node 18; a first discharge circuit 19 connected between node 17 and GND; and a second discharge circuit 20 connected also between node 17 and GND, and wherein the output of inverter G18 provides an output from the second delay circuit DLY2. Further, the first discharge circuit 19 is comprised of: PMOS transistor P25, the source and substrate of which are connected to node 17, and the gate and drain of which are connected in short-circuit; NMOS transistor N10, the substrate of which is grounded, and the gate and drain of which are short-circuited therebetween and connected to the drain of PMOS transistor P25; NMOS transistor N11, the drain of which is connected to the source of NMOS transistor N11, the gate of which is connected to input terminal 3, and the source and substrate of which are connected to GND; NMOS transistor N12, the drain of which is connected to node 17, the gate of which is connected to the gate of NMOS transistor N10, and the substrate of which is connected to GND; and NMOS transistor N13, the drain of which is connected to the source of NMOS transistor N12, the gate of which is connected to input terminal 3, and the source and substrate of which are connected to GND. Still further, the second discharge circuit 20 is comprised of NMOS transistor N15, the drain of which is connected to node 17, the gate of which is connected to input terminal 3, and the source and substrate of which are connected to GND.

The logical configuration for producing a one shot pulse output from the first delay circuit DYL1 and the second delay circuit DLY2 to nodes T1, T2 and T3, respectively, in FIG. 4 is substantially the same as in FIG. 1, wherein the same symbols and numerals are used to identify corresponding gates. Further, a description of the connection of the first and the second delay circuits DLY1, DLY2 with the other logical gates will be omitted because they are substantially the same as presented in the description of the control circuit 14 in FIG. 1.

Now, with reference to FIG. 4, the operation of the control circuit thereof will be described in the following.

At first, when the level of a boost clock signal to input terminal 3 is at the low level, because the inputs to NAND gates G7, G11 and one input to the three-input NAND gate G9 are at the low level, all outputs to nodes T1, T2 and T3 are low level outputs.

At this time, in the first delay circuit DLY1, PMOS transistor P22, the gate of which is connected to input terminal 3, is turned on, thereby biasing node 15 to the power supply voltage VCC of the power supply terminal 1, and thereby causing the PMOS transistor P23, the gate of which is connected to node 15, to be in the off-state. Also, an output the of inverter G15, which is connected to input terminal 3, becomes high level, thereby causing PMOS transistor P24 to be in the off-state, NMOS transistor N9 to be in the on-state, and node 16 to become low level. Then, an output of inverter G116, which is the output of the first delay circuit DYL1, is set at a high level in response to this low level of node 16.

Further, in the second delay circuit DLY2, because all of the NMOS transistors N11, N13 in the first discharge circuit 19 and the NMOS transistor N15 in the second discharge circuit 20 are in the off-state, a current does not flow from node 17 toward the ground via these discharge circuits 19 and 20, therefore, these discharge circuits are in a so-called off-state. Because other arrangements thereof except for these discharge circuits are the same as in the first delay circuit DLY1, node 17 thereof is biased to power supply voltage VCC by PMOS transistor P26. Then, node 18 is biased to the low level by NMOS transistor N16, and an output of inverter G18, which provides the output from the second delay circuit DLY2, is set also in the high level state response to this biased low level of node 18.

Subsequently, when the level of the boost clock signal shifts to the high level, because both outputs of the first and the second delay circuits DYL1 and DLY2 are in a high level state, both outputs of the NAND gates G7 and G11 in response to this high level become low level, therefore, nodes T1 and T3 which produce a reverse output thereof are shifted to high level. As for the three-input NAND gate G9, which has as one of its inputs a reversed output of the first delay circuit DLY1 by inverter G6, it maintains a high level output, therefore, node T2 is at low level.

At this instant, with regard to the first delay circuit DYL1, the NMOS transistor N8, the gate of which is connected to input terminal 3 therein, becomes on-state, thereby starting discharge of capacitance C2 which is connected to node 15 via resistance R1. Then, at a time when the potential of node 15 is caused to drop by a value of threshold voltage |vthp| of PMOS transistor P23, the PMOS transistor P23 is turned on. Then, when the level of a boost clock signal is shifted to the high level, an output of inverter G15 becomes low level, NMOS transistor N9 becomes off-state, and PMOS transistor P24 becomes on-state, respectively. In this case, however, PMOS transistor P23 is still in the off-state, and node 16 is at low level. Then, at the time when the potential of node 15 drops, and PMOS transistor P23 is turned on, as described above, node 16 is caused to shift to high level immediately, thereby causing the output of the first delay circuit DYL1 to shift to low level. In response to this shift, the output of the NAND gate G7 shifts to the high level, thereby causing node T1 to return to the low level. Also, at this instant, the output of inverter G6 becomes high level, and the output of three-input NAND gate G9 becomes low level, thereby causing node T2 to shift to the high level.

As mentioned hereinabove, the width of the one shot pulse of node T1, that is, the period of time for duration of the high level of node T1 is determined by a delay time until the PMOS transistor P23 is turned on. Further, this delay time can be determined by a discharge time constant based on resistance R1 and capacitance C2, and by the threshold voltage |vthp| of PMOS transistor P23, therefore, its relative dependency on power supply voltage VCC can be minimized.

On the other hand, also in the second delay circuit DLY2, basically in the same manner as in the first delay circuit DLY1, discharge of capacitance C3 which is connected to node 17 is carried out via resistance R2, and when the potential of node 17 drops by an amount of the threshold voltage |vthp| of the PMOS transistor P27, the PMOS transistor P27 is turned on so as to shift node 18 to the high level, thereby causing an output from the second delay circuit DLY2 to shift to the low level. In response to this shift to the low level, nodes T2 and T3 are caused to return to the low level.

Further, in the second delay circuit DLY2, NMOS transistors N11 and N13 in the first discharge circuit 19, as well as NMOS transistor N15 in the second discharge circuit 20, are set to the on-state, thereby setting a ready-to-discharge state for flow of a discharge current from node 17 to the ground.

More specifically, in the first discharge circuit 19, when the NMOS transistors N11 and N13 become on-state, each source potential of NMOS transistors N10 and N12 is biased to the ground potential, and thus, each voltage across the gate and source of NMOS transistors N10 and N12 becomes approximately equal so as to form a current mirror. At this time, in order for a discharge current to flow toward NMOS transistor N10 which serves as its reference, because it is necessary for both PMOS transistor P25 and NMOS transistor N10 to be set to the on-state, at least the potential of node 17 needs to be greater than a sum of their threshold voltages. In other words, in such a case where the potential of node 17 is greater than a sum of the threshold voltage |Vthp+Vthn| of PMOS transistor P25 and a threshold voltage Vthn of NMOS transistor N10, i.e., |Vthp+Vthn|, a discharge current is allowed to flow toward PMOS transistor P25 and NMOS transistor N11, and, therefore, a discharge current multiplied by its mirror ratio is caused to flow toward NMOS transistor N12, thereby rapidly, discharging capacitance C3. This discharge current increases according to a quadratic function with an increase in power supply voltage VCC; therefore, the delay time in the second delay circuit DLY2 can be reduced greatly in the high voltage region of power supply voltage VCC. On the other hand, because both of PMOS transistor P25 and NMOS transistor N10 are in the off-state in the low voltage region thereof, and no discharge current flows toward NMOS transistor N12, the discharge time constant of node 17 is determined by resistance R2 and capacitance C3.

As for the second discharge circuit 20, by appropriately setting the on-resistance of NMOS transistor N15 therein, the dependency of its delay time on power supply voltage VCC in a voltage range before the first discharge circuit 19 starts its operation can be adjusted. For example, in the vicinity of the minimum value in the range of use of power supply voltage VCC, the on-resistance of NMOS transistor N15 is set at a value which is sufficiently greater than the value of resistance R2, and its on-resistance is allowed to decrease gradually with an increase in power supply voltage VCC until its on-resistance decreases approximately to the value of resistance R2 or smaller before starting the operation of the first discharge circuit, such that second delay circuit DLY2 is provided which, while ensuring an adequate delay time, can further increase the dependency of its delay time on the power supply voltage VCC in the low voltage region thereof. By way of example, provision of the second discharge circuit 20 is not always necessary, and may be used appropriately in consideration of the dependency of a stepped-up output voltage on power supply voltage VCC and the like.

Therefore, by setting respective constants such that the discharge time constant of the second delay circuit DLY2, which is determined by resistance R2 and capacitance C3, becomes larger than the discharge time constant of the first delay circuit DYL1, which is determined by resistance R1 and capacitance C2, respective characteristics of respective delay circuits proposed according to the embodiment of the invention in FIG. 1 can be accomplished.

Further, when the level of the boost clock signal is caused to shift from high to low, the outputs from inverter G15 in the first delay circuit DLY1 and from inverter G17 in the second delay circuit DLY2 become high level, thereby causing NMOS transistors N9 and N16 therein to turn on, and causing PMOS transistors P24 and P28 therein to become off-state. Thereby, both the node 16 in the first delay circuit DLY1 and the node 18 in the second delay circuit DLY2 become low level. Therefore, immediately after the level of the boost clock signal is shifted to low, the outputs of the fist delay circuit DYL1 and the second delay circuit DLY2 return to high levels. Further, by turning on the PMOS transistor P22, capacitance C2 in the first delay circuit DYL1 is once again charged to power supply voltage VCC to return to its initial state. Also, in the second delay circuit DLY2, because both the first and the second discharge circuits 19 and 20 are in the off-state, and the current path from node 17 toward the ground GND is interrupted, the capacitance C3 therein is charged to power supply voltage VCC, due to the turning on of PMOS transistor P26 therein, to return to its initial state, like capacitance C2 in the first delay circuit.

Further, as for nodes T1, T2 and T3, on the side where the level of the boost clock signal is shifted to high level, because they are already returned to low levels in response to reversals of the outputs of the first and the second delay circuits DYL1 and DLY2, there occurs no change on the side of the low level transition of the boost clock signal, thereby maintaining the low level thereof.

Figure 5:
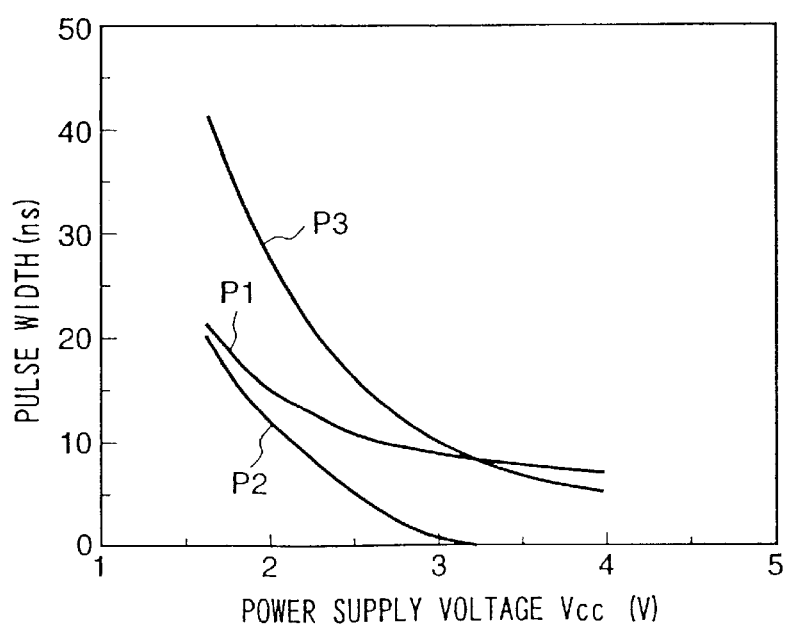
FIG. 5 is a characteristic diagram illustrating output characteristics of the control circuit according to the invention.

The output characteristics of the control circuit 14 of FIG. 4 are shown in FIG. 5, where power supply voltage VCC is indicated on the abscissa, and the pulse widths of respective one shot pulses output to nodes T1, T2 and T3 are indicated on ordinate.

The curve P1 in FIG. 5 represents the one shot pulse width characteristic for node T1, which corresponds to a delay time of the first delay circuit DLY1, and which indicates a relatively flat dependency on power supply voltage VCC. In contrast, a curve P3 represents the one shot pulse width characteristic at node T3, which corresponds to a delay time of the second delay circuit DLY2, and which indicates a greater dependency on power supply voltage VCC. A curve P2 indicates pulse widths of one shot pulses at node T2, which correspond to a difference between respective one shot pulses at nodes T3 and T1 . This pulse width P2 is attenuated rapidly with an increase in power supply voltage VCC approximately analogous to P3, and, for example, at about 3.5 V, it disappears or becomes zero.

As can be clearly understood from the characteristic diagram of FIG. 5, by incorporation of control circuit 14 of FIG. 4 into the apparatus of FIG. 1, the booster circuit of the invention can be realized, which circuit can adequately boost a voltage which is in the low voltage region of power supply voltage VCC in the vicinity of, for example, 2 V and needs boosting thereof, and can automatically suppress its step-up voltage in the high voltage region, for example, in excess of 3 V, or stop the boosting operation thereof.

Figure 6:
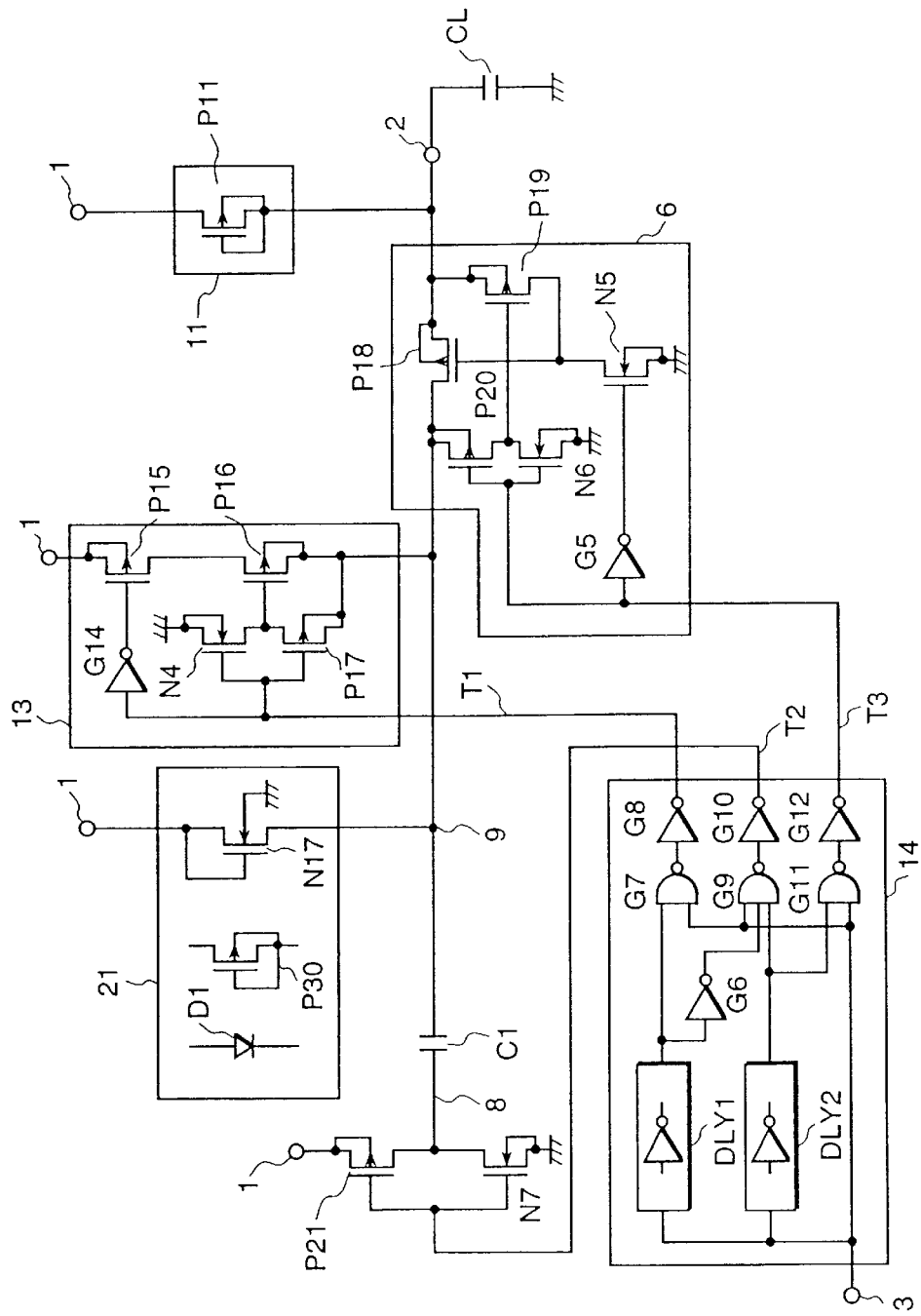
FIG. 6 is a schematic circuit diagram of a second embodiment of a booster circuit according to the invention.

Now, a second embodiment of the invention will be described with reference to FIG. 6.

In the second embodiment of the invention, the switching circuit 12 of the first embodiment indicated in FIG. 1 is replaced by a bias circuit 21, and the other components thereof are the same as in FIG. 1. The bias circuit 21 is comprised as a bias means for applying a bias voltage to one terminal (node 9) of booster capacitance C1 in accordance with a power supply voltage VCC. More specifically, bias circuit 21 is comprised of NMOS transistor N17, the gate and drain of which are connected, to power supply terminal 1, the source of which is connected to node 9, and the substrate of which is connected to the ground GND. In this case, various modifications may be adopted, which, for example, instead of NMOS transistor N17, uses PMOS transistor P30, the source of which is connected to power supply terminal 1, and the gate, drain and substrate of which are connected to node 9, or diode D1, the anode of which is connected to power supply terminal 1 and the cathode of which is connected to node 9. Any of these alternative devices may be used, if they are able to interrupt a current flowing from node 9 to power supply terminal 1, and to allow a current to flow from power supply terminal 1 to node 9 if a sufficient potential difference is given for each device to turn on. Therefore, any device, in addition to those indicated in FIG. 6, may be used as well, if it has the same function, which may include a NPN transistor or a PNP transistor.

A description of the operation of the circuit components in this second embodiment of the invention, except for the bias circuit 21, will be omitted as they are the same as in FIG. 1.

At first, when the level of the boost clock signal is at low level, node 8 is biased to power supply terminal VCC, therefore, a potential on the side of node 9 is at a stepped-up potential higher than the power supply voltage VCC. At this instant, because the level at node 9 is higher than the power supply voltage VCC, the bias circuit 21 and switching circuit 13 are in an interrupted state, thereby blocking a current flow from node 9 toward power supply terminal 1. Further, the charge transfer circuit 6 is in the on-state, thereby allowing a boosted potential of node 9 to be transferred toward output terminal 2. In its initial state, at which no boost clock signal has yet been received, node 9 and output terminal 2 are arranged to be charged from power supply terminal 1 via bias circuit 21 and bias circuit 11.

Subsequently, when the level of its boost clock signal is shifted to high level, firstly, switching circuit 13 becomes on-state in response to the one shot pulse from node T1, so as to bias node 9 to the level of the power supply voltage VCC and to discharge the booster capacitance C1. Further, at this time, the charge transfer Circuit 6 becomes off-state in response to the one shot pulse of node T3, which is produced concurrently, thereby preventing a reverse flow of the boost charge from output terminal 2 to node 9.

When the one shot pulse of node T1 terminates, a one shot pulse is applied to node T2 subsequently, in response to which, the potential of node 8 drops from the level of the power supply voltage VCC to the ground GND potential via NMOS transistor N7. At this time, because booster capacitance C1 is discharged in advance, the potential of node 9 also tends to drop to the ground potential. Thereby, a potential difference arises between power supply terminal 1 and node 9, thereby causing NMOS transistor N17 within bias circuit 21 to turn on, and thereby allowing for a charging current to flow from power supply terminal 1 to node 9 to charge booster capacitance C1. Because this charging current is allowed to flow only during a period of time when the potential of node 8 is at the ground potential, that is, a period of time for the one shot pulse width of node T2 (during high level period), a charge voltage $\Delta V$ for booster capacitance C1 can be defined by a one shot pulse width of node T2 in the same manner as in the aforementioned first embodiment of the invention. However, in bias circuit 21, because there exists a voltage drop involved in the threshold voltage of NMOS transistor N17, the charging efficiency thereof will drop accordingly, thereby causing its boost efficiency in the low voltage region of power supply voltage VCC to drop lower than that of the preceding embodiment of the invention. On the other hand, in the higher voltage region thereof, the reduction of the charge efficiency itself leads to a suppression of the step-up voltage.

In the next step, at the time when the one shot pulses of nodes T2 and T3 end, PMOS transistor P21 becomes on-state, thereby biasing node 8 to the level of the power supply voltage VCC once again so as to produce a stepped-up voltage VCC+$\Delta V$ at node 9, and, at the same time, causing charge transfer circuit 6 to become on-state to allow for the voltage produced at node 9 to be transferred toward output terminal 2, thereby executing the booster operation.

According to the second embodiment of the invention, because of the provision of bias circuit 21 in place of switching circuit 12, the same advantage and effect as in the preceding embodiment of the invention has been accomplished in a more compact circuit configuration.

A third embodiment of the invention will be described with reference to FIG. 7.

In the third embodiment of the invention, switching circuit 12 as used in FIG. 1 is omitted, and a switching circuit 22 is provided in place of switching circuit 13 therein, and the control of this switching circuit 22 is executed by a one shot pulse produced in node T3. By provision of this arrangement of the invention, the control previously effected by node T1 is eliminated, and therefore, NAND gate G7 and inverter G8 previously provided in the control circuit 14 can be eliminated.

Switching circuit 22 is provided as a switching means for applying a power supply voltage to one terminal (at node 9) of booster capacitance C1 in response to a one shot pulse (control signal) produced at node T3.

More specifically, switching circuit 22 is comprised of: PMOS transistor P31, the source of which is connected to power supply terminal 1, and the drain and substrate of which are connected to node 9; PMOS transistor P32, the source and substrate of which are connected to node 9, and the drain of which is connected to the gate of PMOS transistor P31; and NMOS transistor N17, the drain of which is connected to the gate of PMOS transistor P31, the source and substrate of which are connected to GND, and the gate of which is connected to node T3, together with the gate of PMOS transistor P32.

Also, in this third embodiment of the invention, one shot pulses produced at nodes T2 and T3 are generated in the same manner as in the preceding embodiments of the invention, wherein, at the time of transition of the level of the boost clock signal to high level, a one shot pulse of high level appears at node T3, and, during this period at high level, the charge transfer circuit 6 is in the off-state, thereby interrupting a current flowing from output terminal 2 toward node 9. At this time, in switching circuit 22, NMOS transistor N17 becomes on-state in response to the high level of node T3, thereby biasing the gate of PMOS transistor P31 to GND potential. Thereby, PMOS transistor P31 turns on to bias node 9 to the level of the power supply voltage VCC of power supply terminal 1. At this time, node T2 maintains its low level for a period of time corresponding to delay time of the first delay circuit DLY1 in control circuit 14, and thereby, because node 8 is biased to the level of the power supply voltage VCC for that period of time, upon turning on of PMOS transistor P31, the potentials at both the terminals of booster capacitance C1 become equal to the power supply voltage VCC, thereby discharging the booster capacitance C1.

Subsequently, after elapse of the period of time corresponding to the delay time td1 of the first delay circuit DYL1, the level of node T2 shifts to high level, thereby biasing node 8 to the ground potential. In accompaniment with this, the potential at node 9 tends to drop to the ground potential. At this time, however, as indicated in FIG. 2, because node T3 retains its high level, the PMOS transistor P31 in the switching circuit 22, is still in the on-state; therefore, in response to a potential drop at node 9, the supply of a charging current from the power supply terminal to the booster capacitance C1 starts. This charging current is supplied during a period of time while node 8 is biased to the ground potential and while the one shot pulse of node T2 is at the high level. Therefore, in the same manner as in the preceding embodiments of the invention, a charging voltage $\Delta V$ for booster capacitance C1 can be defined according to the one shot pulse width of node T2.

Subsequently, when the levels of the one shot pulses produced at nodes T2 and T3 return to low levels, the node 8 is biased to the level of the power supply voltage VCC, thereby causing a stepped-up voltage to appear at node 9. At the same time, in switching circuit 22, NMOS transistor N17 is turned off, and PMOS transistor P32 is turned on, thereby biasing the gate of the PMOS transistor P31 to the potential of node 9. Thereby, PMOS transistor P31 is turned off, so as to interrupt a current flowing from node 9 toward power supply terminal 1. Further, at this time, simultaneously, the charge transfer circuit 6 turns on so as to allow a boosted potential at node 9 to be transferred toward output terminal 2.

In the third embodiment of the invention, the configuration of the switching circuit 22 can be modified to be identical with those of switching circuits 12 and 13 of FIG. 1 to allow for the same operation as described above. Namely, in the preferred embodiment of FIG. 1, because the charging of booster capacitance C1 therein is arranged to be controlled by switching circuit 12, it is necessary to interrupt a current flowing from power supply terminal 1 to node 9 on the side of switching circuit 13, thereby necessitating provision of PMOS transistor P15, inverter G14 and the like.

Further, in this embodiment of the invention, because switching circuit 22 operates to serve as both the switching circuits 12 and 13 of FIG. 1, PMOS transistor P31 is used in on-state except for a boost operation, which is executed by biasing node 8 to the level of the power supply voltage VCC, there occurs no problem even if there exists a parasitic diode with its forward direction being from power supply terminal 1 to node 9. Therefore, such devices corresponding to PMOS transistor P15 and inverter G14 in switching circuit 13 are not required.

According to this embodiment of the invention, however, because PMOS transistor P31 serves both functions for discharging and charging of the booster capacitance C1, it is necessary to obtain an optimum design of pulse widths of one shot pulses to be output to nodes T2 and T3 relative to its current drive capability. For example, at the time of the discharge operation of booster capacitance C1, it is preferred for PMOS transistor P31 to operate as an ideal switch with its on-resistance being indefinitely close to zero. However, in the charging thereof, if the PMOS transistor P31 functions as the ideal switch, a charge voltage ΔV of booster capacitance C1 always becomes power supply voltage VCC, thereby preventing the control of a charge voltage in accordance with a one shot pulse width of node T2 from being accomplished according to the requirements of the invention. Thereby, it becomes necessary to provide for an appropriate current drive capability to PMOS transistor P31 or to set its on-resistance at an appropriate value, and to design timings of discharging and charging duration for booster capacitance C1 corresponding thereto.

According to the third embodiment of the invention, the same effect and advantages as in the first embodiment of the invention can be obtained in a more compact circuit configuration.

Figure 8:
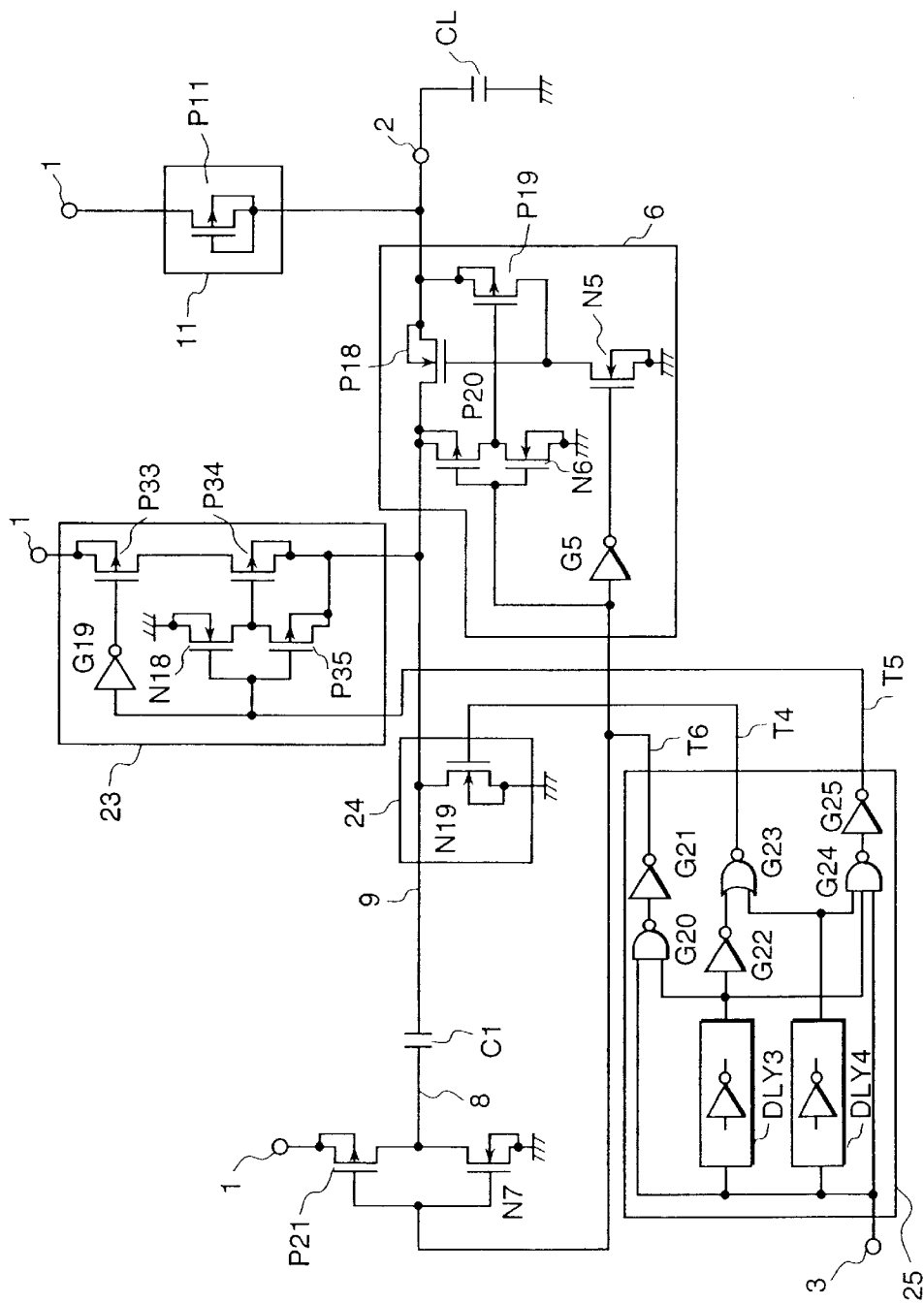
FIG. 8 is a schematic circuit diagram of a fourth embodiment of a booster circuit according to the invention.

Now, with reference to FIG. 8, a fourth embodiment of the invention will be described.

According to the fourth embodiment of the invention, a power supply voltage is applied to one terminal of booster capacitance C1 in a charging period thereof, while a reference potential is applied to the other terminal thereof; and, further, in the charging period thereof, the application of the power supply voltage to the one terminal of booster capacitance C1 is stopped for a period of time which is determined by a magnitude of the power supply voltage, and at the same time, the voltage of the reference potential is applied to the one terminal of booster capacitance C1 so as to discharge booster capacitance C1. Then, in a subsequent charge transfer period, the power supply voltage is applied to the other terminal of booster capacitance C1 so as to allow for a charge accumulated in booster capacitance C1 to be transferred from the one terminal thereof to the output terminal 2.

Namely, in the fourth embodiment of the invention, a control circuit 25 is provided in place of control circuit 14 of FIG. 1, and switching circuits 23 and 24 are provided in place of switching circuits 12 and 13 of FIG. 1. In this arrangement, switching circuit 24 is connected to node T4 from control circuit 25; switching circuit 23 is connected to node T5; and charge transfer circuit 6, the gates of transistor P21 and transistor N7 are connected to node T6.

Control circuit 25 is comprised of: a charge command signal output means for outputting a charge command signal to node T6 as a one shot pulse which defines a charging period in a voltage boosting cycle which includes the charging period and a charge transfer period; a control signal output means for outputting a control signal as a one shot pulse to node T5 corresponding to starting of the charging period, then after elapse of a period of time which is determined in accordance with the magnitude of power supply voltage VCC, for stopping the output of the control signal of one shot pulse; and a discharge command signal output means for outputting a discharge command signal as a one shot pulse to node T4 only for a period of time within the charging period which is determined by the magnitude of the power supply voltage VCC when the output of the control signal is stopped.

Figure 9:
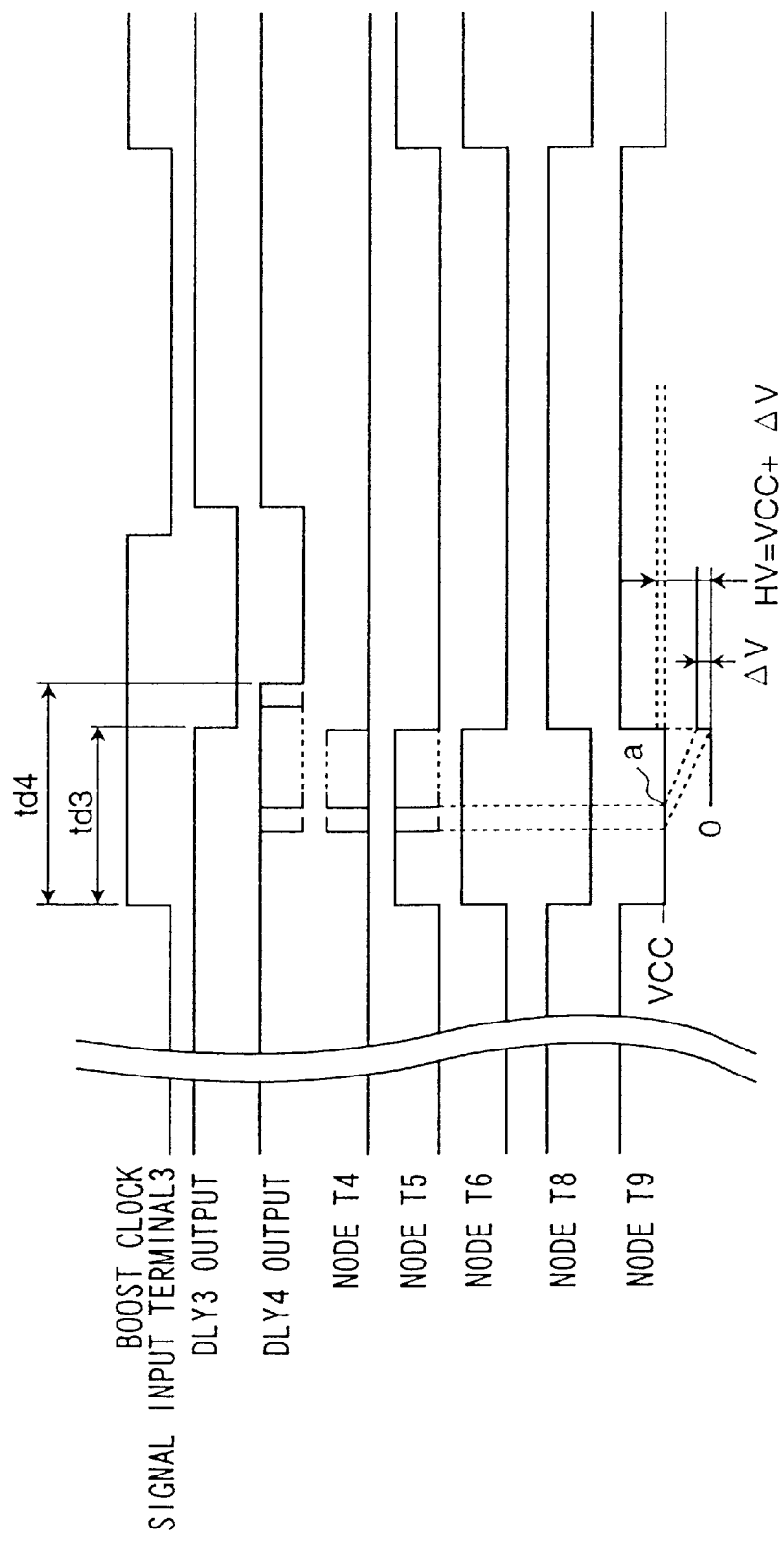
FIG. 9 is a waveform diagram illustrating the operation of the circuit of FIG. 8.

More specifically, control circuit 25 is comprised of: a third delay circuit DLY3, the input of which is connected to input terminal 3; a fourth delay circuit DLY4, the input of which is connected to input terminal 3 via a common input line with the input of the third delay circuit; NAND gate G20, one of the inputs of which is connected to an output of the third delay circuit DLY3 and the other input of which is connected to input terminal 3; inverter G21, the input of which is connected to the output of NAND gate G20 and the output of which is connected to node T6; inverter G22, the input of which is connected to the output of the third delay circuit DLY3; NOR gate G23, one of the inputs of which is connected to the output of inverter G22 and the other input of which is connected to the output of the fourth delay circuit DLY4, and the output of which is connected to node T4; three-input NAND gate G24, a first input of which is connected to the output of the fourth delay circuit DLY4, a second input of which is connected to the output of the third delay circuit DLY3, and a third input of which is connected to input terminal 3; and inverter G25, the input of which is connected to the output of the three-input NAND gate G24, and the output of which is connected to node T5. Further, the third delay circuit DLY3 and the fourth delay circuit DLY4 are designed to have a logic polarity to produce a reversed output relative to their inputs, namely, to produce a reversed output in response to a boost clock signal input to input terminal 3. As shown in FIG. 9, a delay time td4 of the fourth delay circuit DLY4 is greater than a delay time td3 of the third delay circuit DLY3 when the power supply voltage is low, and the delay time td4 is caused to decrease with an increase of the power supply voltage. Namely, td4 has a greater dependency on power supply voltage VCC than td3. Still further, the third and the fourth delay circuits DLY3 and DLY4 can be constituted according to the circuit configurations of the first and the second delay circuits DLY1 and DLY2 indicated in FIG. 4.

Switching circuit 24 is constituted as a first switching means for applying a voltage of reference potential to one terminal of booster capacitance C1 in response to the one shot pulse of the discharge command signal produced in node T4. Namely, switching circuit 24 is comprised of NMOS transistor N19, the drain of which is connected to node 9, the source and substrate of which are connected to GND, and the gate of which is connected to node T4.

Switching circuit 23 is constituted as a second switching means for applying a power supply voltage to the one terminal (at node 9) of booster capacitance C1 in response to the one shot pulse of the control signal produced in node T5.

More specifically, switching circuit 23 is comprised of inverter G19, the input of which is connected to node T5;

PMOS transistor P33, the gate of which is connected to the output of inverter G19, and the source and substrate of which are connected to power supply terminal 1; PMOS transistor P34, the source of which is connected to the drain of PMOS transistor P33, and the drain and substrate of which are connected to node 9; PMOS transistor P35, the source and substrate of which are connected to node 9, and the drain of which is connected to the gate of PMOS transistor P34; and NMOS transistor N18, the source and substrate of which are connected to GND, the drain of which is connected to the gate of PMOS transistor P34, and the gate of which is connected to node T5 together with the gate of PMOS transistor P35 via common line.

Charge transfer circuit 6 is constituted as a means for interrupting a charge transfer path connecting the one terminal of booster capacitance C1 and output terminal 2 during a period of time while the one shot pulse of charge command signal is at the high level, and for forming the charge transfer path during other periods of time. The specific circuit configuration thereof is the same as that in the preceding embodiments of the invention.

The operation of this embodiment of the invention will be described with reference to FIG. 9. At first, when the level of a boost clock signal is low level, both outputs of NAND gate G20 and three-input NAND gate G24 become high level, and both of the levels of the nodes T6 and T5, to which the reversed signals of the outputs at high level are produced, are at the low level. At this time, in response to an output of the fourth delay circuit DLY4, which is at the high level, the output of the NOR gate G23, that is, of node T4, is also at the low level.

Responsive to the levels of nodes T4, T5 and T6 which, are all at low level, as described above, switching circuits 23 and 24 are turned off, thereby interrupting current paths between node 9, power supply terminal 1 and the ground. Further, in charge transfer circuit 6, PMOS transistor P18 is in the on-state, thereby short-circuiting the path between node 9 and output terminal 2. Still further, PMOS transistor P21 is in the on-state, thereby biasing node 8 to the level of the power supply voltage VCC, so as to allow a step-up voltage to be produced at node 9. A detailed description of the internal operation of the switching circuit 23 will be omitted because the arrangement thereof is the same as that of switching circuit 13 shown in FIG. 1, and its response to the one shot pulse signal of a high/low level is also the same therein. Further, a detailed description of the operation of the charge transfer circuit 6 will be omitted because its circuit configuration is the same as that of FIG. 1.

On the other hand, the switching circuit 24 is comprised of NMOS transistor N19, wherein a gate signal is input from node T4; therefore, if the level of node T4 becomes high, the NMOS transistor N19 changes to the on-state, and, if the level of node T4 becomes low, the NMOS transistor N19 is in the off-state.

Then, when the level of a boost clock signal shifts to the high level, respective outputs of the third and the fourth delay circuits DLY3 and DLY4 shift to low levels with respective delay times of td3 and td4 as indicated in FIG. 9.

Here, when the specification of the power supply voltage VCC is set to a low voltage region lower than its preset voltage for use, a relation td3 ≦td4 is established, as indicated in FIG. 9; therefore, in the low voltage region of the power supply voltage VCC, there exists no over-lapping between a period where the level of the output of the fourth delay circuit DLY4 is low and a period where the level of output of the third delay circuit DLY3 is high, and so the output of NOR gate G23, i.e., the level of node T4, is fixed at a low level. That is, the level of node T4 is continuously fixed to a low level.

On the other hand, a one shot pulse is produced at nodes T5 and T6, respectively, as indicated in FIG. 9, having a duration at the high level corresponding to the width of the delay time td3 from the third delay circuit DLY3. In the high level period of each one shot pulse, the gate of the PMOS transistor P18 in the charge transfer circuit 6 is biased to the potential of the output terminal 2, thereby interrupting a current flowing from the output terminal 2 to node 9. Further, the NMOS transistor N7 turns on to bias node 8 to the ground potential, and, at the same time, the switching circuit 23 changes to the on-state to bias node 9 to the level of the power supply voltage VCC. Thereby, booster capacitance C1 is charged up to the level of the power supply voltage VCC as a potential difference between its two terminals. Further, in a condition where node 8 is biased to the level of the power supply voltage VCC, because no timing for discharging the booster capacitance C1 is provided by biasing node 9 to power supply voltage VCC, if the above-mentioned charging cycle is repeated, the booster capacitance C1 is always maintained in a state in which it is charged to the level of the power supply voltage VCC.

Then, when the one shot pulses of high level at nodes T5 and T6 are terminated, and the levels thereof return to their low levels, a switching circuit 23 changes to the off-state, thereby interrupting the current paths between node 9 and power supply terminal 1. At the same time, PMOS transistor P21 turns on, thereby biasing node 8 to the level of the power supply voltage VCC, so as to generate a step-up voltage at the node 9, and concurrently, the PMOS transistor P18 within the charge transfer circuit 6 changes to the on-state, thereby transferring the step-up voltage at node 9 toward the output terminal 2. As described above, in the case where the booster capacitance C1 is charged to the potential of the power supply voltage VCC, the output terminal 2 is allowed to reach a stepped-up voltage which is twice that of the power supply voltage VCC in a saturated condition. Namely, in the low voltage region of the power supply voltage VCC, where a relation is established between the delay time td3 of the third delay circuit DLY3 and the delay time td4 of the fourth delay circuit DLY4 such that td3≦td4, a step-up voltage which is as great as twice the power supply voltage VCC can be obtained.

In the following, a case will be considered where the specification of the power supply voltage VCC is set in a high voltage region in excess of a preset voltage for use, and where a relation is established between delay times td3 and td4 such that td3>td4, as a result of a decrease in delay time td4 of the fourth delay circuit DLY4. Namely, this example corresponds to a case where when the power supply voltage is above a preset voltage, the duration period of the discharge command signal is adjusted to become longer in accordance with an increase of the power supply voltage, or where, when the power supply voltage drops below the preset voltage for use, the duration period of the discharge command signal is adjusted to become zero or to be shortened in accordance with a decrease of the power supply voltage.

In this case, there arises an overlapping between a low level period of output from the fourth delay circuit DLY4 and a high level period of output from the third delay circuit DLY3, and a one shot pulse having a high level period corresponding to an overlap period of td3−td4 is output from NOR gate G23 to node T4, as indicated in FIG. 9. That is, a discharge command signal in the form of a one shot pulse is produced only for a period of time within the charging period which is determined by the magnitude of power supply voltage VCC. Further, because the high level period of the one shot pulse outputted to node T5 is determined by either one of the delay times of the third or the fourth delay circuits DLY3 or DLY4, whichever is shorter, subsequently, its period becomes to correspond to the delay time td4, and it returns to low level simultaneously with a high level transition of node T4.

Here, consider the case when the level of the boost clock signal changes to the high level. In response to transitions of the levels of nodes T5 and T6 to high levels, the PMOS transistor P18 within the charge transfer circuit 6 changes to the off-state, and the NMOS transistor N7 changes to the on-state, such that node 8 is biased to ground potential, and, at the same time, the switching circuit 23 changes to the on-state to bias node 9 to the level of the power supply voltage VCC for charging the booster capacitance C1. Then, after elapse of the delay time td4 of the fourth delay circuit DLY4, at the same time as the level of node T4 changes to the high level, the level of node T5 returns to low level. Thereby, the switching circuit 23 changes to the off-state, and the NMOS transistor N19 within the switching circuit 24 changes to the on-state, thereby causing a charge in the booster capacitance C1 to be discharged from node 9 to the ground. This discharge operation for discharging booster capacitance C1 using switching circuit 24 is continued for a high level period of node T4, namely, for a period of time corresponding to the delay time td3−td4.

Thereby, for example, at timing point "a" in FIG. 9, the level of node T4 becomes high level to start the discharge operation, and, when node 9 is discharged to a potential of $\Delta V$, the levels of nodes T4, T5 and T6 are each returned to low levels. The stepped-up voltage appearing at node 9, when node 8 is biased to the level of the power supply voltage VCC, becomes equal to the power supply voltage VCC plus $\Delta V$, which is suppressed below a value twice as large as the power supply voltage VCC. Namely, when the power supply voltage VCC becomes a high voltage and the delay time td4 of the fourth delay circuit DLY4 is reduced, the discharge period of the booster capacitance C1 is increased inversely thereto, so as to decrease $\Delta V$, therefore, in response to an increase of the power supply voltage VCC, the stepped-up voltage is reduced. In particular, when the power supply voltage drops below the preset voltage, the pulse width of the one shot pulse to be output to node T4 as a discharge command signal becomes zero, and, therefore, the stepped-up voltage becomes twice as large as the power supply voltage VCC.

Further, when the power supply voltage is above the preset voltage, the discharge period within the charging period is adjusted to become longer in response to an increase of the power supply voltage in order to secure a step-up voltage (boost level) to be obtained corresponding to the magnitude of the power supply voltage. By way of example, when the specification of the power supply voltage is set at a value which is below the preset voltage for use, the discharge period within the charging period is adjusted to be shortened in accordance with the magnitude of the power supply voltage in order to secure a step-up voltage (boost level) in accordance with the magnitude of the power supply voltage.

According to this embodiment of the invention, the same features and advantages as in the first embodiment of the invention can be obtained. Now, with reference to FIG. 10, a fifth embodiment of the invention will be described.

In this fifth embodiment of the invention, both the charge current IC and the charging period tw indicated in the aforementioned equation (4) are varied in accordance with the magnitude of power supply voltage VCC, such that the charge voltage $\Delta V$ of the booster capacitance C1 can be adjusted. In addition, a bias circuit 26 is provided in place of the switching circuit 12 of the first embodiment of the invention, which receives as its control input a one shot pulse produced at node T3 from control circuit 14. Other components thereof are the same as those of the first embodiment shown in FIG. 1. Further, descriptions of bias circuit 11, charge transfer circuit 6, output terminal 2 and load capacitance CL will be omitted.

Bias circuit 26 is constituted as a bias means for applying a bias current to one terminal (at node 9) of booster capacitance C1 in accordance with the level of the power supply voltage in response to a one shot pulse of high level (control signal) produced from control circuit 14 to node T3.

More specifically, bias circuit 26 is comprised of: NMOS transistor N20, the drain of which is connected to power supply terminal 1, the source of which is connected to node 9, and the substrate of which is connected to GND; resistance R3, which is connected between power supply terminal 1 and the gate of NMOS transistor N20; NMOS transistor N23, the drain of which is connected to the gate of NMOS transistor N20, and the source and substrate of which are connected to GND; PMOS transistor P36, the source and substrate of which are connected to power supply terminal 1, and the gate of which is connected to an output of inverter G26, the input of which is connected to node T3; PMOS transistor P37, the source of which is connected to the drain of PMOS transistor P36, the substrate of which is connected to power supply terminal 1, and the gate and the drain of which are short-circuited; NMOS transistor N21, the substrate of which is connected to GND, and the gate and the drain of which are connected to the drain of PMOS transistor P37; and NMOS transistor N22, the gate and the drain of which are short-circuited and connected to the source of NMOS transistor N21 and to the gate of NMOS transistor N23 via a common connection, and the source and substrate of which are connected to GND, and wherein NMOS transistor N22 and NMOS transistor N23 are provided to form a current mirror, with each voltage thereof between the gate and source being always the same.

In the bias circuit 26 comprising the above-mentioned arrangement, when the level of node T3 is at low level, the output level of inverter G26 becomes high, thereby holding the PMOS transistor P36 in the off-state, and thereby allowing no current to flow toward NMOS transistor N22. Therefore, no drain current flows in NMOS transistor N23 that forms the current mirror with NMOS transistor N22, and, therefore, the gate of NMOS transistor N20 is biased to the level of the power supply voltage VCC via resistance R3.

On the other hand, when the level of node T3 changes to the high level, PMOS transistor P36 turns on, thereby readying itself for a current to flow toward NMOS transistor N22. At this time, whether to allow a current to flow toward NMOS transistor N22 or not depends on the voltage at the power supply terminal 1. That is, in order to turn on NMOS transistor N22 and allow a drain current to flow, it is a prerequisite for both the PMOS transistor P37 and the NMOS transistor N21 to be turned on; therefore, it is necessary for the voltage at the power supply terminal 1, i.e., power supply voltage VCC, to be greater than at least a sum of the threshold voltages thereof. Assuming each of threshold voltages to be equal to Vth, it is a condition in order to allow a current to flow toward NMOS transistor N22 for VCC >3×Vth.

If the power supply voltage satisfies the above condition, and a current flows toward NMOS transistor N22, a drain current magnified by a mirror ratio is allowed to flow in NMOS transistor N23 which forms the current mirror with NMOS transistor N22. Thereby, a voltage drop occurs in resistance R3, thereby decreasing the gate voltage of the NMOS transistor N20, and, therefore, the output current of NMOS transistor N20 is reduced.

Figure 10:
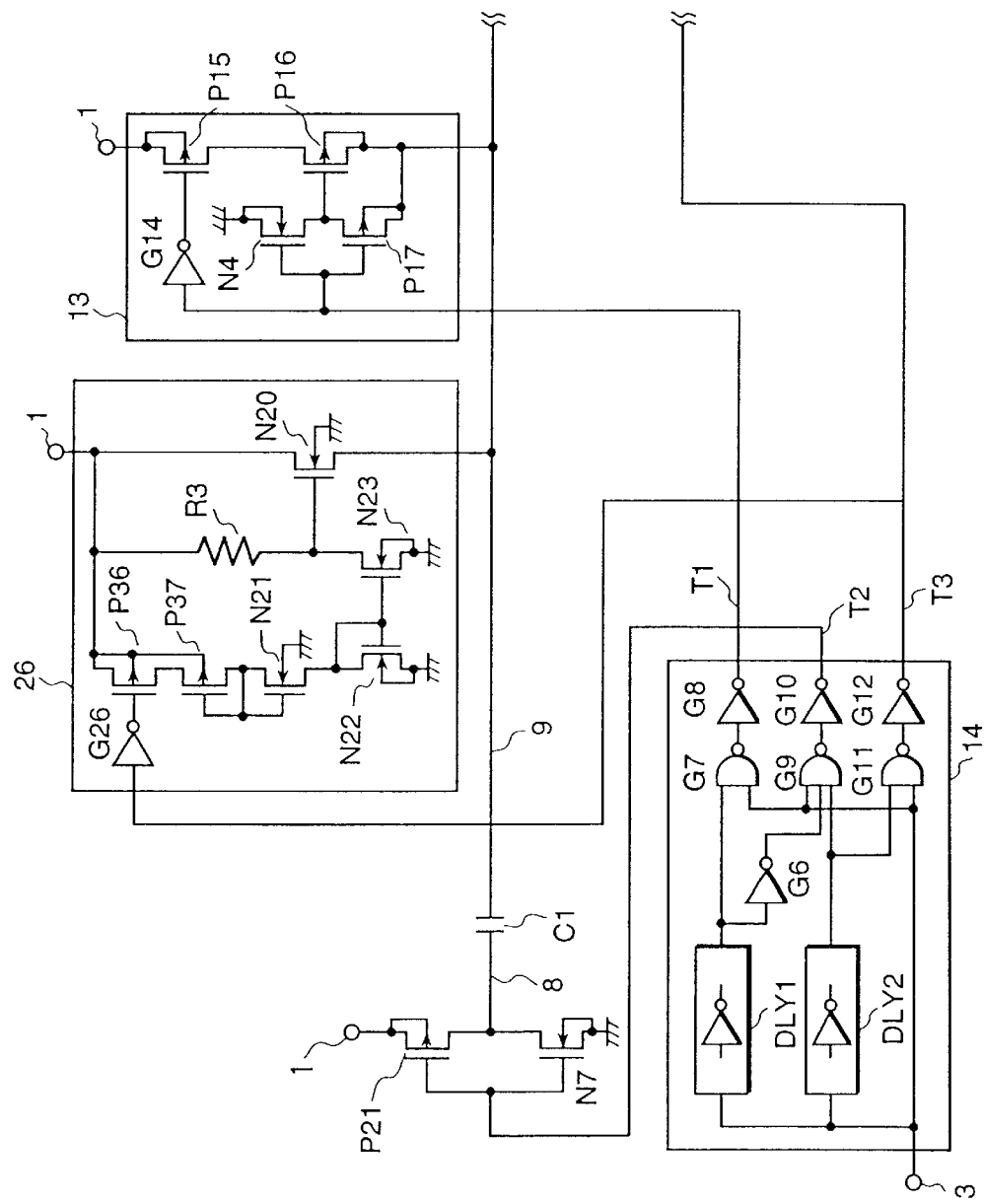
FIG. 10 is a schematic circuit diagram of a fifth embodiment of a booster circuit according to the invention.

According to the embodiment of the invention shown in FIG. 10, in the same manner as the first embodiment illustrated in FIG. 1, at first, in response to a one shot pulse produced at node T1 upon transition of the level of the boost clock signal to high level, the booster capacitance C1 is discharged by switching circuit 13. Then, at a rise of the one shot pulse produced at node T2, the potential of node 8 is dropped to ground potential by NMOS transistor N7, and charging of the booster capacitance C1 is started by NMOS transistor N20 within bias circuit 26. At this time, a charge current supplied from NMOS transistor N20 to booster capacitance C1 is adjusted in accordance with the magnitude of the power supply voltage VCC. Namely, as its power supply voltage increases to the high voltage region, its charge current is reduced, such that a charge voltage ΔV for charging the booster capacitance C1 can be reduced. Further, when the power supply voltage is lower than the preset voltage for use, its charge current is increased in accordance with a drop of the power supply voltage, and also, when the power supply voltage exceeds the preset voltage, its charge current can be reduced to zero. Therefore, according to this embodiment of the invention, a step-up voltage can be more effectively suppressed in the high voltage region compared to the first embodiment of the invention.

Further, according to this embodiment of the invention, depending on the requirements for its specification or conditions, the charging period tw is fixed, and the charge voltage ΔV for charging the booster capacitance C1 is adjusted so as to suppress its step-up voltage by means of a circuit, such as bias circuit 26, which can adjust the level of the charge current in accordance with its power supply voltage.

Still further, in this embodiment of the invention, although on/off control of the current flowing through bias circuit 26 is enabled by a one shot pulse produced at node T3, the invention is not limited to this control method, but may be modified such that, if no current consumption problem occurs, for example, the PMOS transistor P36 can be omitted by connecting the source of the PMOS transistor P37 directly to power supply terminal 1, and a gate bias of NMOS transistor N20 is determined by constantly monitoring the voltage of power supply terminal 1. Still more, bias circuit 26 is not limited to the configuration of FIG. 10, and any other modifications thereof can be adopted as long as they are able to provide the same functions as bias circuit 26.

According to this embodiment of the invention, the same features and advantages achieved by the first embodiment of the invention described above can be obtained with a further improvement on the suppression effect of a step-up voltage in the high voltage region.

Figure 7:
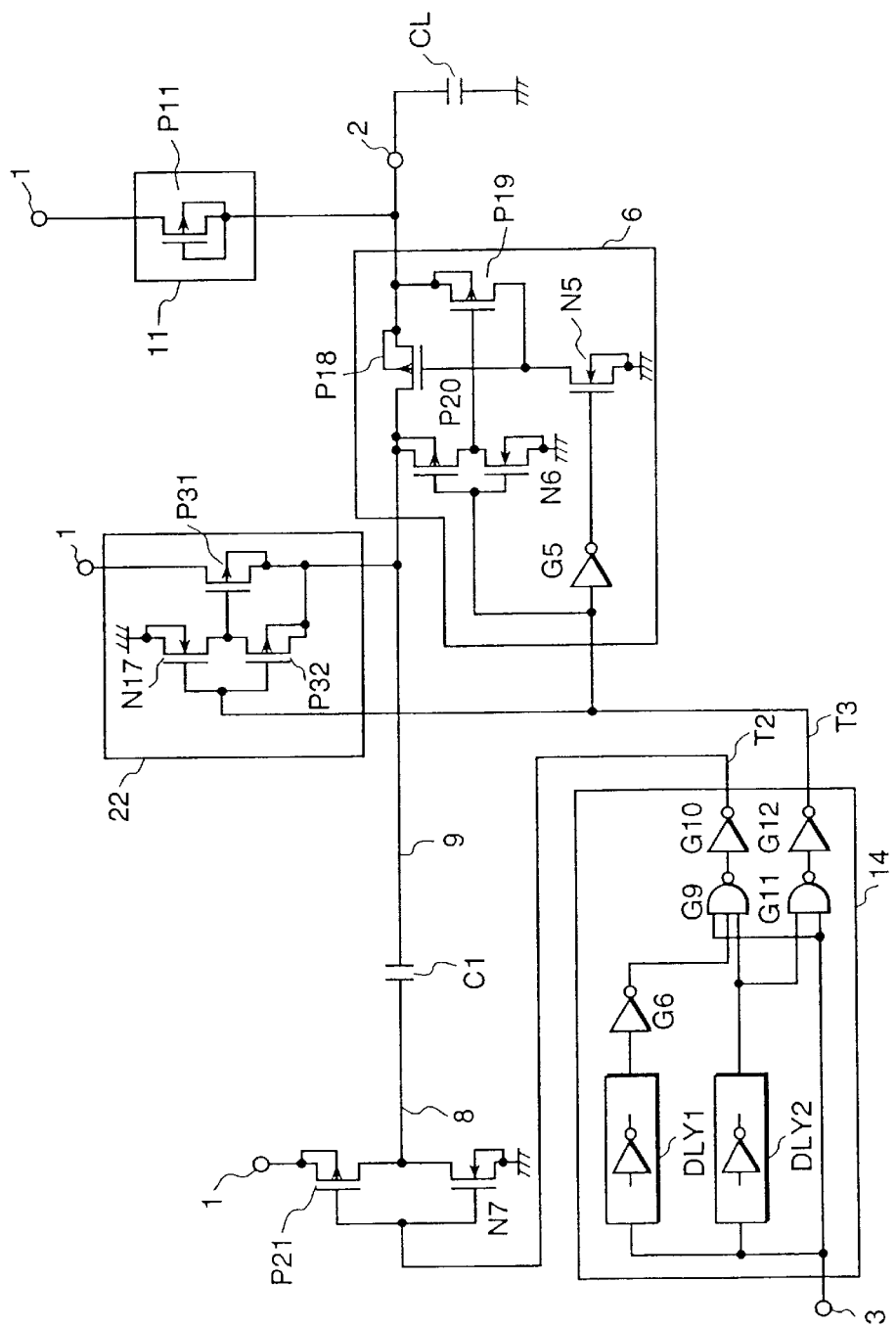
FIG. 7 is a schematic circuit diagram of a third embodiment of a booster circuit according to the invention.
Figure 11:
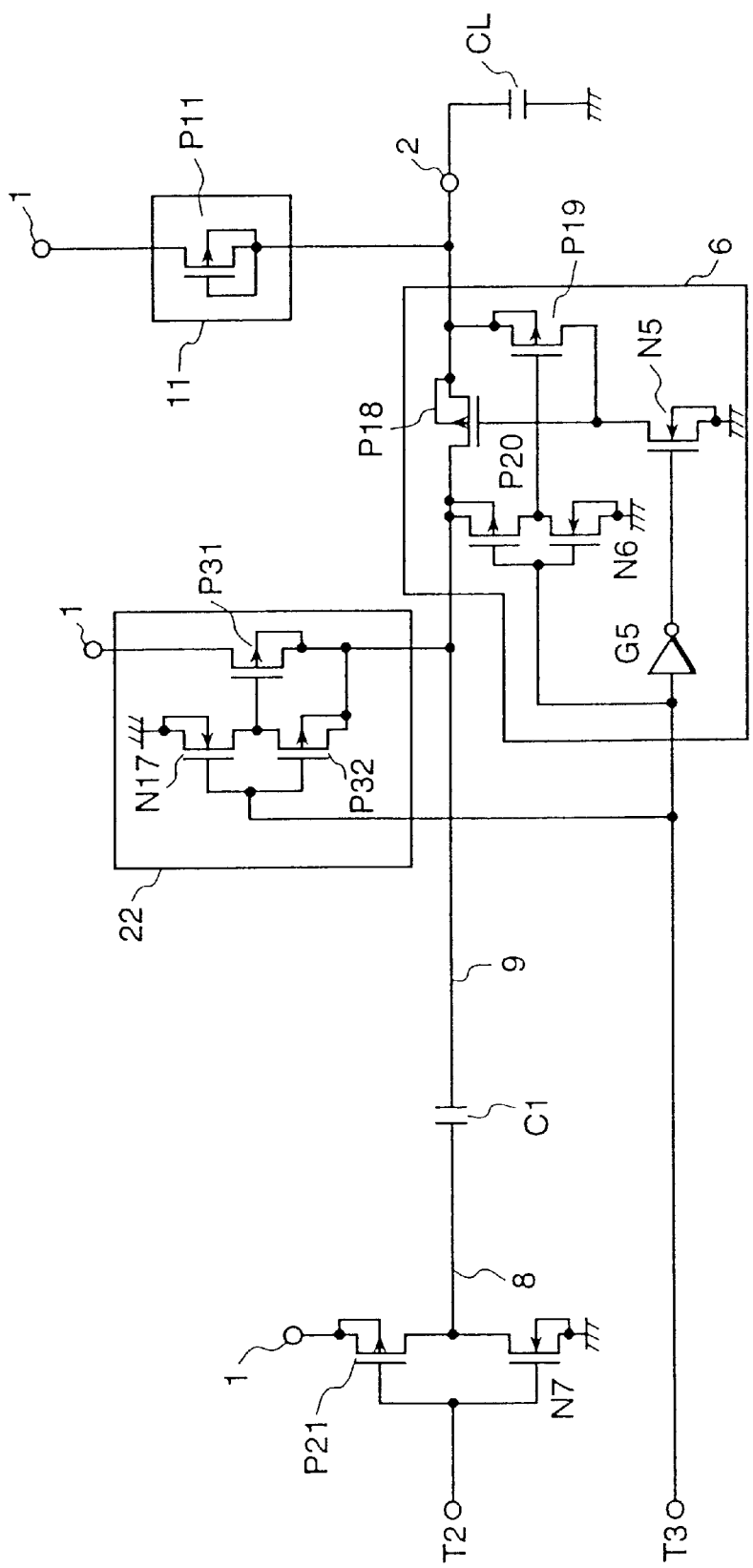
FIG. 11 is a schematic circuit diagram which shows a modification of the embodiment of the invention of FIG. 7, wherein the same is controlled by a control input signal instead of the control circuit.

Further, in FIG. 11, the feature is to control the switching circuit 22 and charge transfer circuit 6, not by use of the control circuit 14, as depicted in FIG. 7, but by application of control input signals to control terminals T2 and T3. By adjustment of a control input width in accordance with a magnitude of the voltage to be used (a voltage applied to power supply terminal 1), a desired step-up voltage can be obtained. In addition to the same features as obtained by other embodiments, the control of the stepped-up voltages becomes easier.

Figure 12:
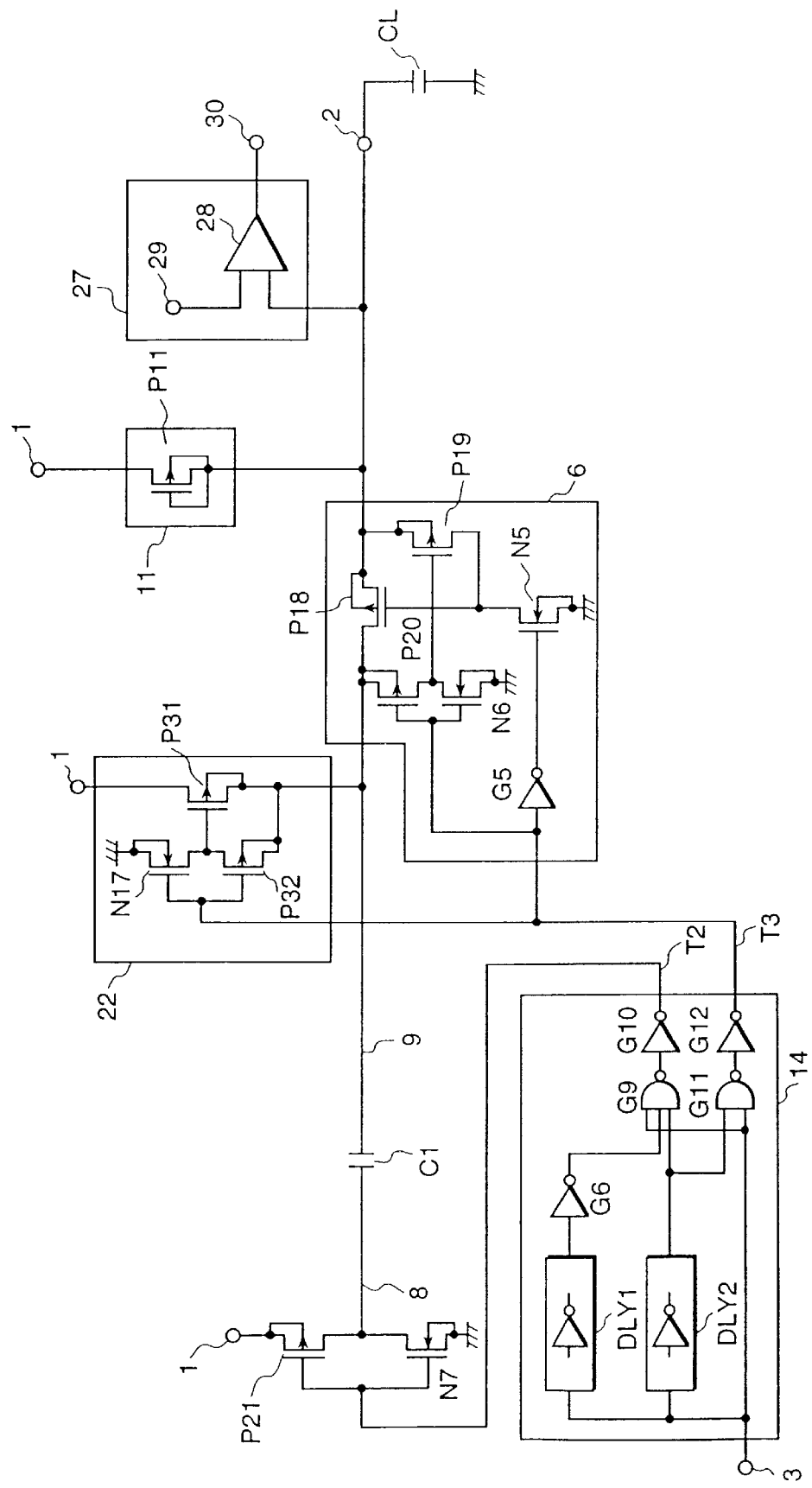
FIG. 12 is a schematic circuit diagram which shows a modification of the embodiment of the invention of FIG. 7, wherein a step-up voltage detection circuit is provided.

FIG. 12, a boost voltage detection circuit 27 is provided in the portion of output terminal 2 of FIG. 7. The boost voltage detection circuit 27 is comprised of a comparator 28, one input of which is connected to boost output terminal 2 and the other input of which is connected to input terminal 29 for comparing the boost output voltage and input terminal voltage 29.

Because a decision in a logic signal 1level as to whether or not a desired boost voltage is achieved is output from output terminal 30 of comparator 28, a process control for integrating this booster circuit in a system can be facilitated. In particular, by connection of the input terminal 29 with power supply terminal 1, a specific power supply voltage at which a boost voltage drops below a voltage of power supply terminal 1, that is, a power supply voltage at which the boost operation is to be stopped, can be determined.

The same configuration and features as described above with respect to FIG. 7 can also be achieved in the other embodiments of the invention.

Figure 13:
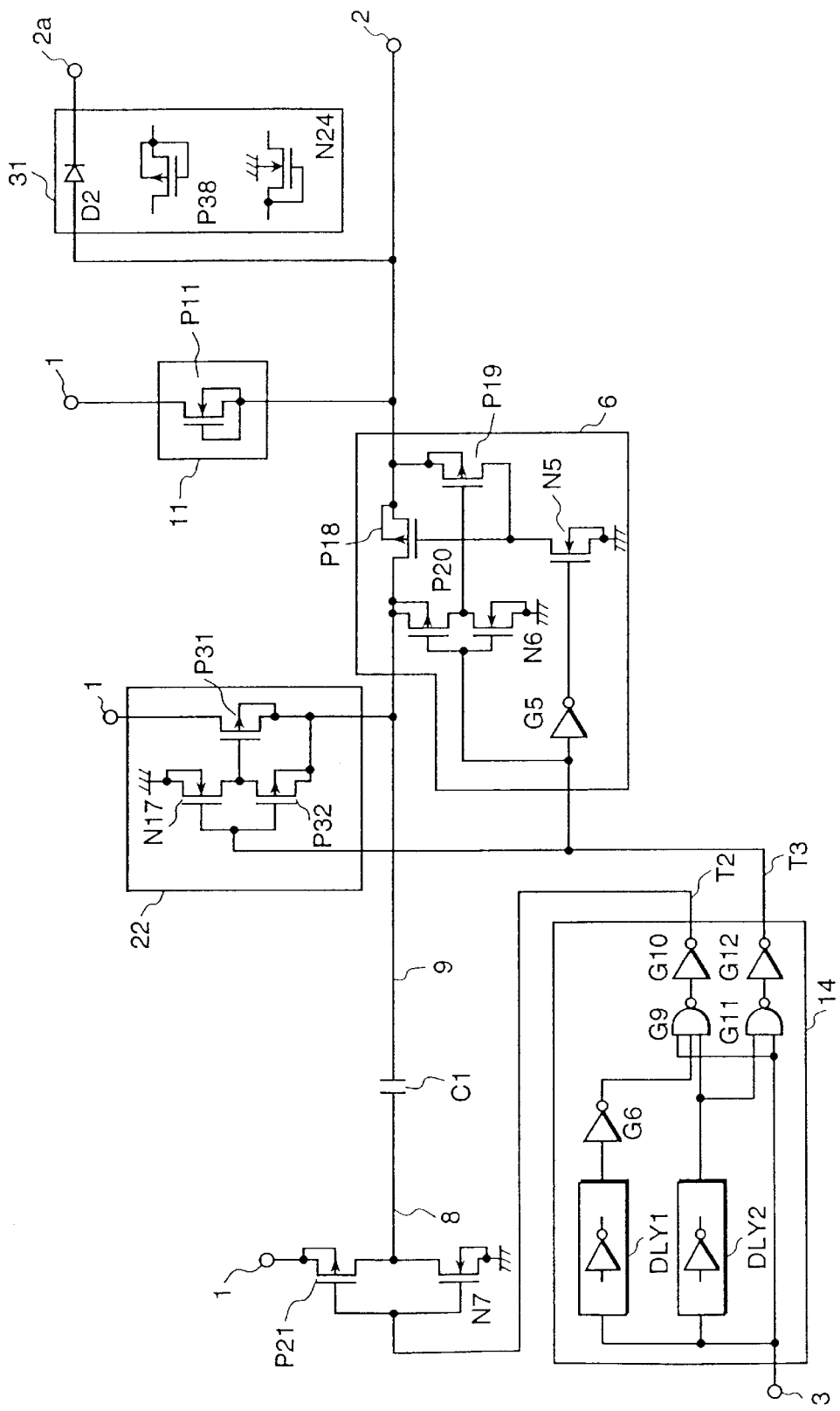
FIG. 13 is a schematic circuit diagram which show a modification of the embodiment of the invention of FIG. 7, wherein another step-up voltage output terminal is provided.

FIG. 13, a boost output terminal 2a is provided in addition to the boost output terminal 2 provided in the embodiment of FIG. 7. The boost output terminal 2a in FIG. 13 is connected to boost output terminal 2 via a voltage drop means 31, which is comprised of a diode D2, PMOS transistor P38 or NMOS transistor N24; however, the invention is not limited thereto, and the terminal 2a can be connected via a switching device or the like depending on its object. Still further, the boost output terminal is not limited to the terminal 2a alone, and a plurality thereof may be provided.

According to this embodiment of the invention, a boost circuit capable of outputting a plurality of different boost voltages can be provided.

Figure 14:
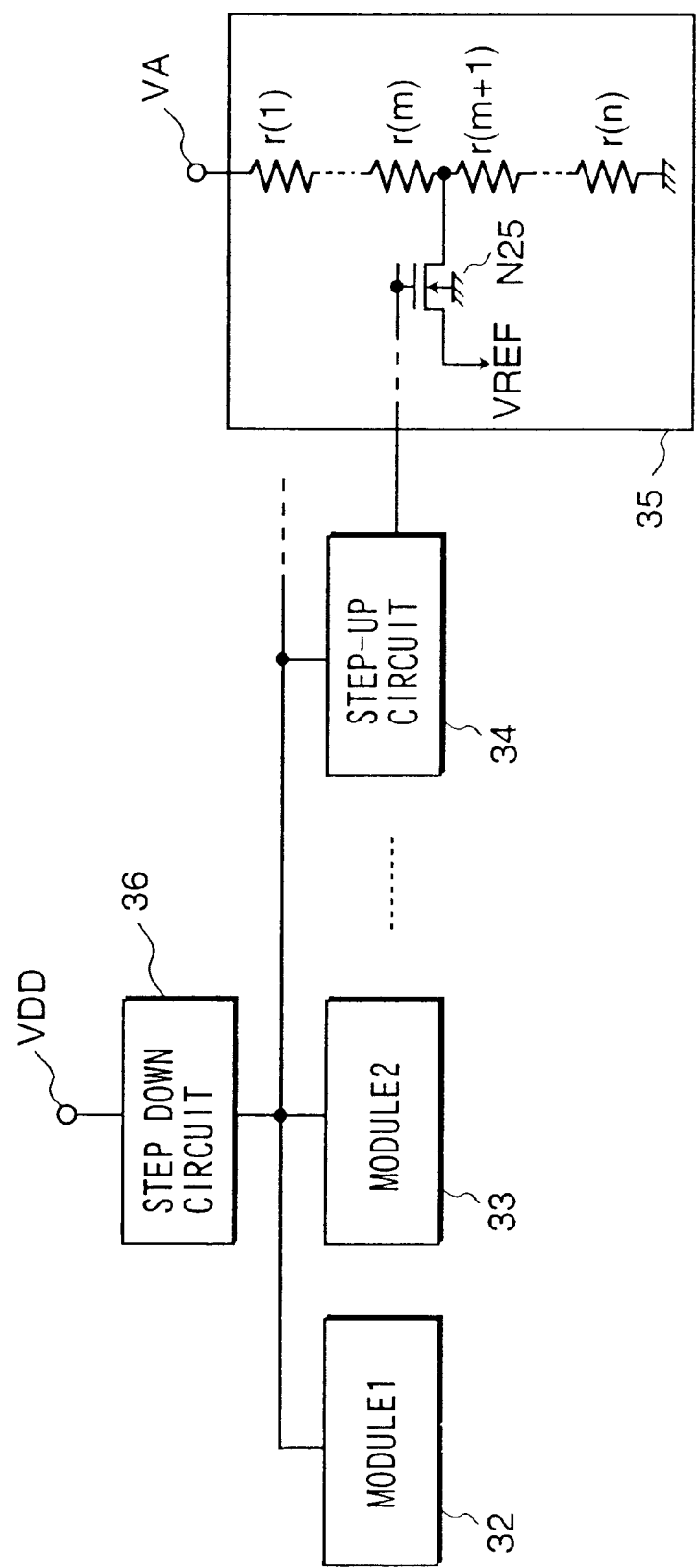
FIG. 14 is a block diagram of an integrated semiconductor circuit provided with the booster circuit according to the invention.

In FIG. 14, an example of the configurations of microprocessors designed to minimize power consumption by stepping-down its power supply voltage VDD is illustrated. A step-down circuit 36 is provided to clamp the power supply voltage VDD at a preset step-down voltage, and respective modules 32, 33 . . . are provided which use this clamped voltage as their power supply voltage. However, in particular, in a system having a built-in analogue module, because it cannot exhibit its characteristics adequately at such a clamped voltage, it becomes necessary to boost the voltage. The module 35 in FIG. 14 represents one of such examples, wherein a reference voltage read-out portion in an AD converter is indicated. When a reference voltage VREF is to be obtained by reading a contact potential at one of the potential divider resistance points r(1)–r(n) using NMOS transistor N25, there arises a problem in that, when a gate voltage of the NMOS transistor N25 is too low, the on-resistance of the NMOS transistor N25 increases so as to cause its read time to become longer, or its reference voltage VREF drops. Therefore, in order to solve such a problem, the clamped voltage described above is boosted up prior to application to the gate of the NMOS transistor N25 by the voltage boost circuit 34 according to the invention.

According to this embodiment of the invention, an integrated semiconductor circuit device can be provided, which uses step-down circuit 36 and voltage boost circuit 34 in combination, and enables a small current and low power consumption design, while ensuring a faster operation.

As described heretofore, according to the present invention, because the charging period, quantity of charges and charging current for charging the booster capacitance are adjusted in accordance with the magnitude of the power supply voltage, the step-up level (boost voltage) can be regulated according to the magnitude of the power supply voltage.

Further, according to the present invention, because a charging period for charging the booster capacitance is adjusted to become longer in accordance with a drop of the power supply voltage, when its power supply voltage becomes lower than the present voltage, and to be shortened in accordance with an increase of the power supply voltage, or to become zero when its power supply voltage exceeds the preset voltage, the following features and advantages of the invention have been accomplished such that an adequate step-up voltage is ensured in the low voltage region in need of boosting. On the other hand, in the high voltage region without need of boosting, its step-up voltage is suppressed or its boosting function is stopped to always remain within its allowable voltage application range.

Still more, according to the invention, the boosting efficiency thereof can be improved because a loss of charges in the load capacitance connected to the output terminal due to boosting or subsequent transitions to charging/discharging operations of the booster capacitance can be minimized by distributing the charges of the booster capacitance thereto.

What we claim is:

1. A method of control of a voltage boost circuit, having at least a booster capacitance, comprising the steps of:
   applying a power supply voltage to one terminal of said booster capacitance, through a first conduction means, during a charging period within a boost cycle that includes said charging period and a charge transfer period, while applying a reference potential to the other terminal thereof,
   stopping application of said power supply voltage to said one terminal of said booster capacitance only for a period of time within said charging period which is determined in accordance with a magnitude of the power supply voltage, and, at the same time, connecting said one terminal of said booster capacitance to the reference potential through a second conduction means so as to discharge only an amount of charge dependent on said period of time within said charging period-which is determined in accordance with said magnitude of said power supply voltage in said booster capacitance; and
   then, during the charge transfer period to follow, applying said power supply voltage to said other terminal of said booster capacitance through a third conduction means so as to transfer the charge accumulated in said booster capacitance from said one terminal thereof to an output terminal.

2. A method of control of a voltage boost circuit according to claim 1, wherein said charging period decreases as a value of said power supply voltage is increased above a preset value.

3. A method of control of a voltage boost circuit comprising a booster capacitance having a first terminal and a second terminal; charge command signal outputting means for outputting a charge command signal which specifies a charging period within a boost cycle that includes said charging period, a discharge period and a charge transfer period; discharge command signal outputting means for outputting a discharge command signal which specifies said discharge period by which an amount of charge discharged from said booster capacitance is adjusted; first conduction means for electrically connecting said first terminal of said booster capacitance and a power supply terminal; second conduction means for electrically connecting said second terminal of said booster capacitance and a reference voltage; third conduction means for electrically connecting said first terminal of said booster capacitance and said reference voltage; fourth conduction means for electrically connecting said second terminal of said booster capacitance and said power supply terminal; and fifth conduction means for electrically connecting said first terminal of said booster capacitance and an output terminal, said method comprising the steps of:
   setting said first and second conduction means in a conducting state during said charging period, setting said first conduction means in a non-conducting state and said third conduction means in a conducting state during said discharge period following said charging period, setting said second and third conduction means in a non-conducting state and said fourth and fifth conduction means in a conducting state after passage of said discharge period, thereby to transfer charges in said booster capacitance to said output terminal during said charge transfer period; and
   adjusting, by said discharge command signal outputting means, a period in which said discharge command signal occurs in accordance with a magnitude of a power supply voltage.

4. A method of control of a voltage boost circuit according to claim 3, wherein said discharge signal outputting means adjusts in a manner to make an occurrence period of said discharge command signal longer as said power supply voltage increases.

5. A voltage boost circuit apparatus comprising:
   a booster capacitance coupled between a first terminal and a second terminal;
   a charge command signal output means for outputting a charge command signal which specifies a charging period within a boost cycle that includes a discharge period, said charge period and a charge transfer period;
   a control signal output means for outputting a control signal corresponding to start of said discharge period, then stopping the output of said control signal after elapse of a period of time which is determined by a magnitude of a power supply voltage;
   a first switching circuit for applying the power supply voltage to said first terminal of said booster capacitance in response to said control signal;
   a second switch circuit for alternatively applying the power supply voltage to said second terminal of said booster capacitance before said charge command signal is input, and applying a reference potential to said second terminal of said booster capacitance in response to an input of the charge command signal corresponding to the start of said charging period; and
   a charge transfer circuit which forms a charge transfer channel effecting electrical connection between said first terminal of said booster capacitance and a first output terminal during a period of time the output of the control signal is stopped, and interrupts the charge transfer channel therebetween during a period of time the control signal is output from said control signal output means, wherein said charge command signal output means regulates a period of time for duration of said charge command signal in accordance said magnitude of said power supply voltage.

6. A voltage boost circuit apparatus according to claim 5, further comprising a second output terminal which is connected to said first output terminal via a voltage drop means.

* * * * *